(12) United States Patent
Sarkis et al.

(10) Patent No.: US 12,672,125 B2
(45) Date of Patent: Jun. 30, 2026

(54) TECHNIQUES FOR MIXED NUMEROLOGY CO-CHANNEL COEXISTENCE

(71) Applicant: QUALCOMM Incorporated, San Diego, CA (US)

(72) Inventors: Gabi Sarkis, San Diego, CA (US); Sourjya Dutta, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 481 days.

(21) Appl. No.: 18/170,473

(22) Filed: Feb. 16, 2023

(65) Prior Publication Data

US 2024/0284440 A1 Aug. 22, 2024

(51) Int. Cl.
| | |
|---|---|
| *H04L 27/26* | (2006.01) |
| *H04L 1/00* | (2006.01) |
| *H04L 1/1812* | (2023.01) |
| *H04L 1/1867* | (2023.01) |
| *H04W 72/12* | (2023.01) |
| *H04W 74/0808* | (2024.01) |

(52) U.S. Cl.
CPC ......... *H04W 72/1215* (2013.01); *H04L 1/189* (2013.01); *H04W 74/0808* (2013.01)

(58) Field of Classification Search
CPC .......... H04W 72/1215; H04W 74/0808; H04L 1/189; H04L 5/0055; H04L 27/26025; H04L 2001/0097; H04L 1/1819
See application file for complete search history.

(56) References Cited

U.S. PATENT DOCUMENTS

| | | | |
|---|---|---|---|
| 2022/0045893 A1* | 2/2022 | Yamada ................ | H04L 1/1896 |
| 2022/0303988 A1* | 9/2022 | Yi ......................... | H04L 5/0044 |
| 2023/0319850 A1* | 10/2023 | Selvanesan ........... | H04W 72/02 |
| | | | 370/329 |
| 2024/0121819 A1* | 4/2024 | Hui ....................... | H04W 72/40 |
| 2024/0292454 A1* | 8/2024 | Kim ...................... | H04W 88/06 |
| 2025/0024505 A1* | 1/2025 | Calcev .............. | H04W 74/0816 |
| 2025/0063583 A1* | 2/2025 | Hui ...................... | H04B 17/328 |

\* cited by examiner

*Primary Examiner* — Nicholas A Jensen
*Assistant Examiner* — Yonghong Zhao
(74) *Attorney, Agent, or Firm* — Holland & Hart LLP

(57) ABSTRACT

Methods, systems, and devices for wireless communication are described. A wireless communication device may transmit, in a radio frequency (RF) spectrum band that supports co-channel coexistence between a first radio access technology (RAT) associated with a first subcarrier spacing (SCS) and a second RAT associated with a second SCS, during a first slot of two or more consecutive slots of a paired transmission, a first redundancy version (RV) of a transport block (TB) that includes a first set of parity bits and a first set of information bits associated with the TB. The wireless communication device may transmit, in the RF spectrum band, during a second slot of the two or more consecutive slots of the paired transmission, a second RV of the TB that includes a second set of parity bits and a second set of information bits associated with the TB.

30 Claims, 14 Drawing Sheets

Time

Figure 11:
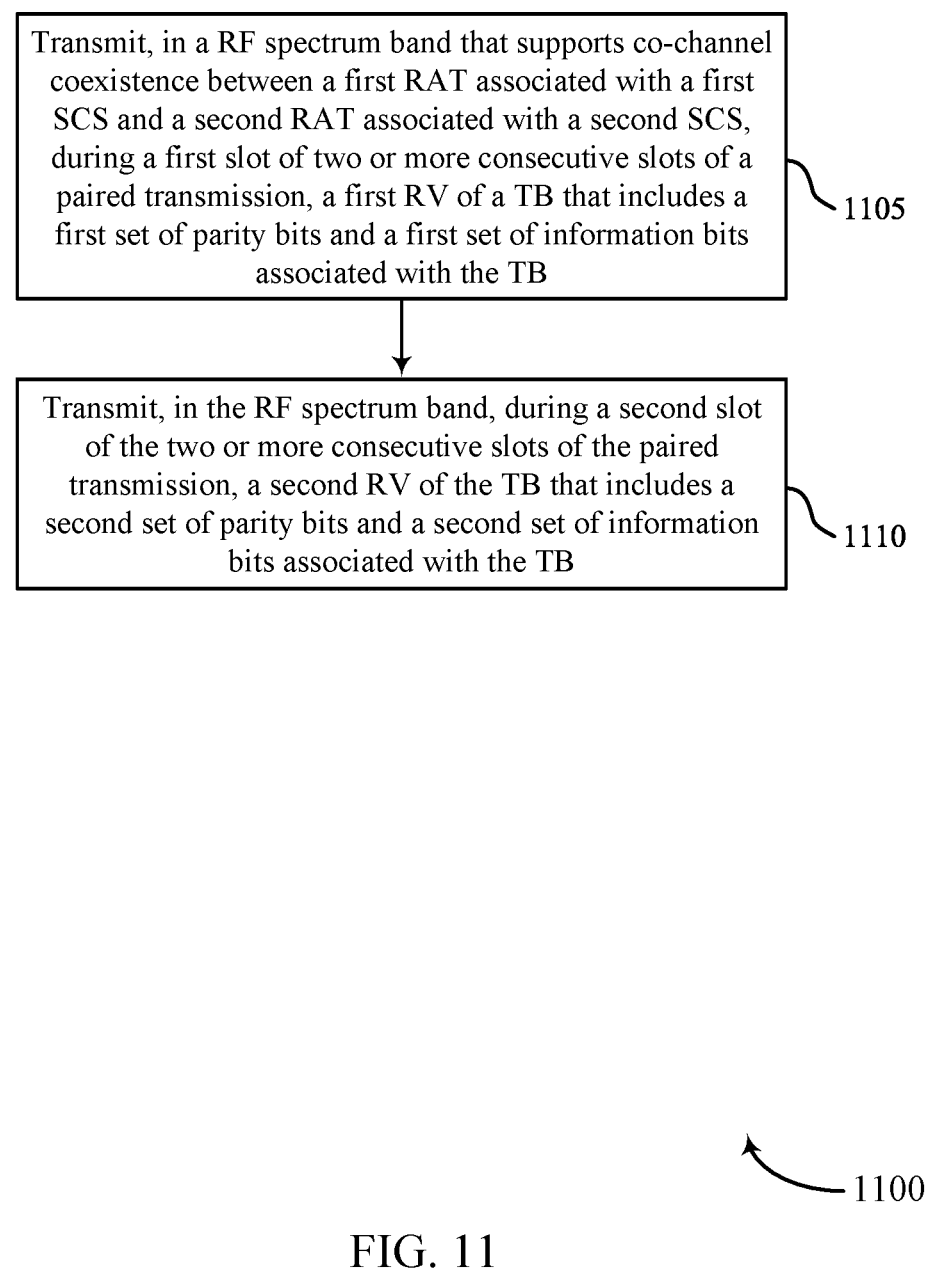

Transmit, in a RF spectrum band that supports co-channel coexistence between a first RAT associated with a first SCS and a second RAT associated with a second SCS, during a first slot of two or more consecutive slots of a paired transmission, a first RV of a TB that includes a first set of parity bits and a first set of information bits associated with the TB

1105

Transmit, in the RF spectrum band, during a second slot of the two or more consecutive slots of the paired transmission, a second RV of the TB that includes a second set of parity bits and a second set of information bits associated with the TB

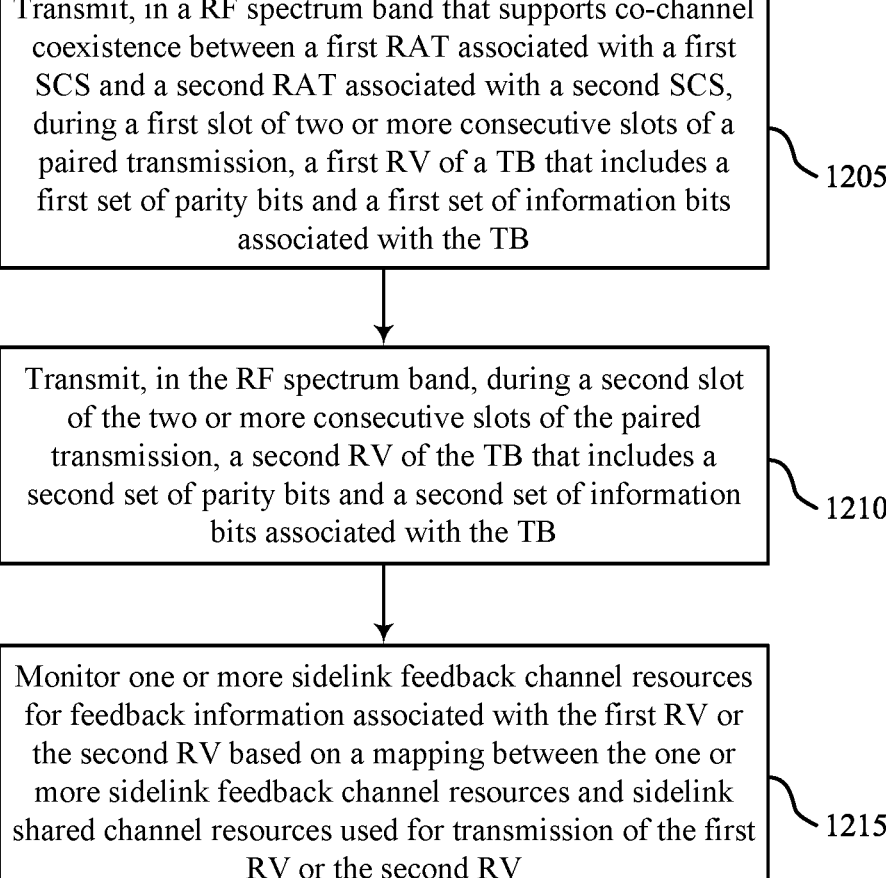

Transmit, in a RF spectrum band that supports co-channel coexistence between a first RAT associated with a first SCS and a second RAT associated with a second SCS, during a first slot of two or more consecutive slots of a paired transmission, a first RV of a TB that includes a first set of parity bits and a first set of information bits associated with the TB

1205

Transmit, in the RF spectrum band, during a second slot of the two or more consecutive slots of the paired transmission, a second RV of the TB that includes a second set of parity bits and a second set of information bits associated with the TB

1210

Monitor one or more sidelink feedback channel resources for feedback information associated with the first RV or the second RV based on a mapping between the one or more sidelink feedback channel resources and sidelink shared channel resources used for transmission of the first RV or the second RV

Figure 13:
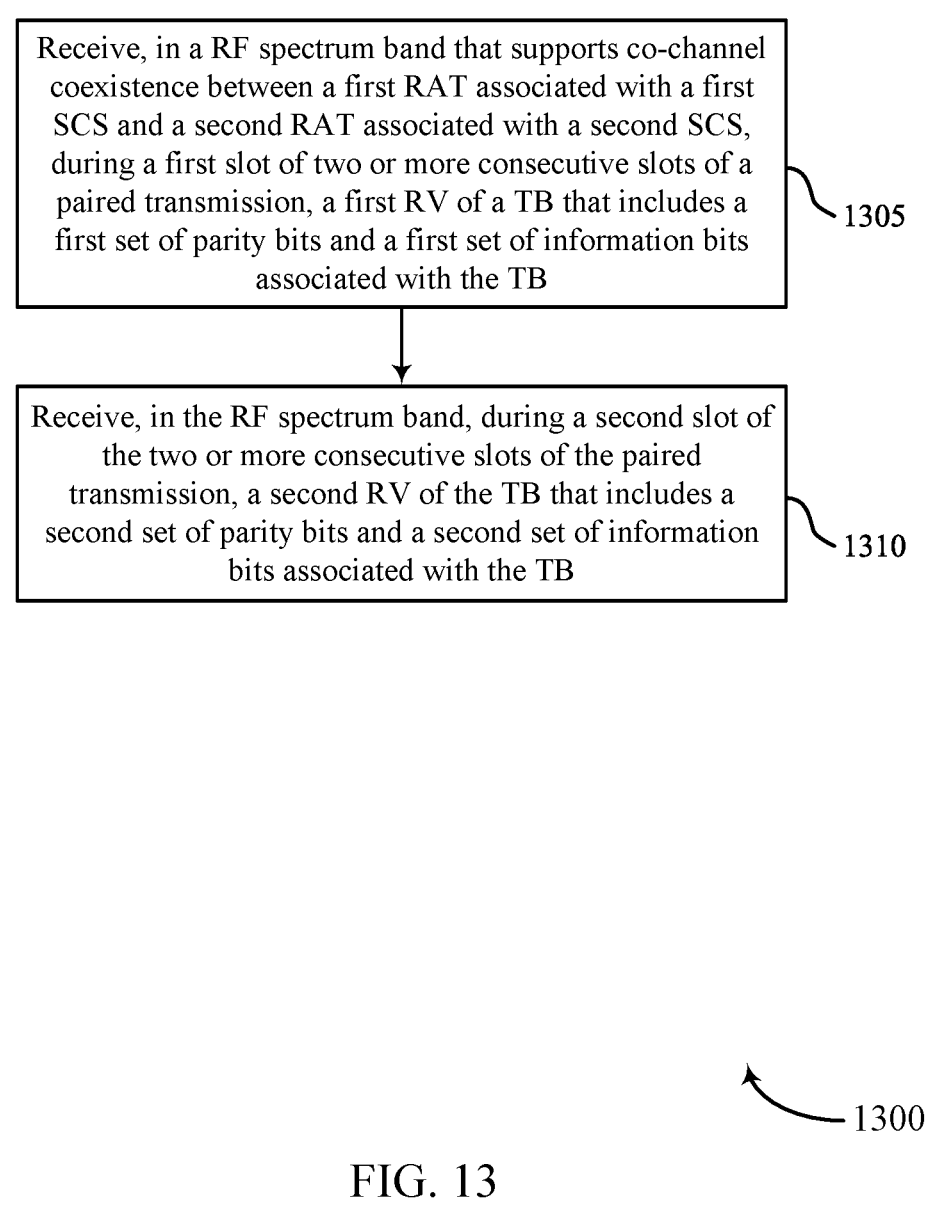

Receive, in a RF spectrum band that supports co-channel coexistence between a first RAT associated with a first SCS and a second RAT associated with a second SCS, during a first slot of two or more consecutive slots of a paired transmission, a first RV of a TB that includes a first set of parity bits and a first set of information bits associated with the TB

1305

Receive, in the RF spectrum band, during a second slot of the two or more consecutive slots of the paired transmission, a second RV of the TB that includes a second set of parity bits and a second set of information bits associated with the TB

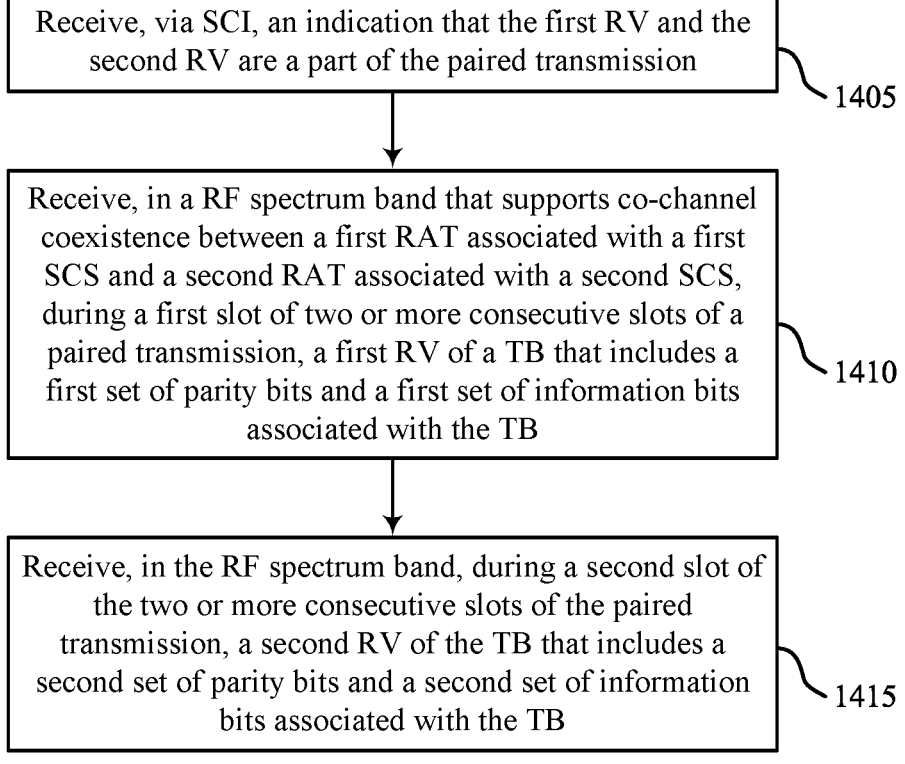

Receive, via SCI, an indication that the first RV and the second RV are a part of the paired transmission ⟍1405

Receive, in a RF spectrum band that supports co-channel coexistence between a first RAT associated with a first SCS and a second RAT associated with a second SCS, during a first slot of two or more consecutive slots of a paired transmission, a first RV of a TB that includes a first set of parity bits and a first set of information bits associated with the TB ⟍1410

Receive, in the RF spectrum band, during a second slot of the two or more consecutive slots of the paired transmission, a second RV of the TB that includes a second set of parity bits and a second set of information bits associated with the TB ⟍1415

TECHNIQUES FOR MIXED NUMEROLOGY CO-CHANNEL COEXISTENCE

FIELD OF TECHNOLOGY

The following relates to wireless communication, including techniques for mixed numerology co-channel coexistence.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless communications systems, transmissions from one device may affect the gain of incoming signals at a second device, which may interfere with reception and decoding operations at the second device.

SUMMARY

The described techniques relate to improved methods, systems, devices, and apparatuses that support techniques for mixed numerology co-channel coexistence. For example, the described techniques provide for transmitting different redundancy versions (RVs) of the same transport block (TB) in two or more consecutive slots (referred to herein as paired slots) to improve the accuracy and reliability of automatic gain control (AGC) operations at one or more wireless communication devices operating in a radio frequency (RF) spectrum band that supports co-channel coexistence between a first radio access technology (RAT) associated with a first subcarrier spacing (SCS) and a second RAT associated with a second SCS.

A method for wireless communication at a wireless communication device is described. The method may include: transmitting, in a RF spectrum band that supports co-channel coexistence between a first RAT associated with a first SCS and a second RAT associated with a second SCS, during a first slot of two or more consecutive slots of a paired transmission, a first RV of a TB that includes a first set of parity bits and a first set of information bits associated with the TB; and transmitting, in the RF spectrum band, during a second slot of the two or more consecutive slots of the paired transmission, a second RV of the TB that includes a second set of parity bits and a second set of information bits associated with the TB.

An apparatus for wireless communication at a wireless communication device is described. The apparatus may include a processor, memory coupled with the processor, and instructions stored in the memory. The instructions may be executable by the processor to cause the apparatus to: transmit, in a RF spectrum band that supports co-channel coexistence between a first RAT associated with a first SCS and a second RAT associated with a second SCS, during a first slot of two or more consecutive slots of a paired transmission, a first RV of a TB that includes a first set of parity bits and a first set of information bits associated with the TB; and transmit, in the RF spectrum band, during a second slot of the two or more consecutive slots of the paired transmission, a second RV of the TB that includes a second set of parity bits and a second set of information bits associated with the TB.

Another apparatus for wireless communication at a wireless communication device is described. The apparatus may include: means for transmitting, in a RF spectrum band that supports co-channel coexistence between a first RAT associated with a first SCS and a second RAT associated with a second SCS, during a first slot of two or more consecutive slots of a paired transmission, a first RV of a TB that includes a first set of parity bits and a first set of information bits associated with the TB; and means for transmitting, in the RF spectrum band, during a second slot of the two or more consecutive slots of the paired transmission, a second RV of the TB that includes a second set of parity bits and a second set of information bits associated with the TB.

A non-transitory computer-readable medium storing code for wireless communication at a wireless communication device is described. The code may include instructions executable by a processor to: transmit, in a RF spectrum band that supports co-channel coexistence between a first RAT associated with a first SCS and a second RAT associated with a second SCS, during a first slot of two or more consecutive slots of a paired transmission, a first RV of a TB that includes a first set of parity bits and a first set of information bits associated with the TB; and transmit, in the RF spectrum band, during a second slot of the two or more consecutive slots of the paired transmission, a second RV of the TB that includes a second set of parity bits and a second set of information bits associated with the TB.

Some examples of the method, apparatuses, and non-transitory computer-readable medium described herein may further include operations, features, means, or instructions for monitoring one or more sidelink feedback channel resources for feedback information associated with the first RV or the second RV based on a mapping between the one or more sidelink feedback channel resources and sidelink shared channel resources used for transmission of the first RV or the second RV.

In some examples of the method, apparatuses, and non-transitory computer-readable medium described herein, the one or more sidelink feedback channel resources correspond to sidelink shared channel resources used for transmission of the first RV when feedback reporting may be enabled for the first RV and the one or more sidelink feedback channel resources correspond to sidelink shared channel resources used for transmission of the second RV when feedback reporting may be enabled for the second RV.

In some examples of the method, apparatuses, and non-transitory computer-readable medium described herein, a transmission order of the first RV and the second RV may be based on a RV cycling configuration of the wireless communication device.

Some examples of the method, apparatuses, and non-transitory computer-readable medium described herein may further include operations, features, means, or instructions for disabling paired transmissions in the RF spectrum band based on a channel busy ratio (CBR) associated with the first RAT.

Some examples of the method, apparatuses, and non-transitory computer-readable medium described herein may further include operations, features, means, or instructions for disabling paired transmissions in the RF spectrum band based at least in part a CBR associated with the second RAT.

Some examples of the method, apparatuses, and non-transitory computer-readable medium described herein may further include operations, features, means, or instructions for obtaining an indication of the CBR associated with the second RAT from a collocated device associated with the second RAT or from one or more channel measurements performed by the wireless communication device.

Some examples of the method, apparatuses, and non-transitory computer-readable medium described herein may further include operations, features, means, or instructions for disabling paired transmissions in the RF spectrum band based on a ratio between traffic associated with the second RAT and traffic associated with the first RAT.

In some examples of the method, apparatuses, and non-transitory computer-readable medium described herein, one of the two or more consecutive slots of the paired transmission includes sidelink feedback channel resources.

In some examples of the method, apparatuses, and non-transitory computer-readable medium described herein, transmitting the first RV and the second RV may include operations, features, means, or instructions for transmitting the first RV of the TB using a first set of sidelink shared channel resources in the first slot and transmitting the second RV using a second set of sidelink shared channel resources in the second slot, where the second slot includes sidelink feedback channel resources.

In some examples of the method, apparatuses, and non-transitory computer-readable medium described herein, transmitting the first RV and the second RV may include operations, features, means, or instructions for transmitting the first RV of the TB in the first slot using a first modulation and coding scheme (MCS) and transmitting the second RV of the TB in the second slot using a second MCS that may be different from the first MCS, where the second slot includes sidelink feedback channel resources.

Some examples of the method, apparatuses, and non-transitory computer-readable medium described herein may further include operations, features, means, or instructions for transmitting, via sidelink control information (SCI), an indication that the first RV and the second RV may be a part of the paired transmission from the wireless communication device.

In some examples of the method, apparatuses, and non-transitory computer-readable medium described herein, the first RV and the second RV may be a part of the paired transmission that includes one or more retransmissions of the TB.

In some examples of the method, apparatuses, and non-transitory computer-readable medium described herein, the second RAT includes a Long Term Evolution (LTE) Vehicle to Everything (V2X) sidelink RAT and the first RAT includes a New Radio (NR) V2X sidelink RAT.

In some examples of the method, apparatuses, and non-transitory computer-readable medium described herein, the first SCS may be 30 kilohertz (kHz) and the second SCS may be 15 kHz.

In some examples of the method, apparatuses, and non-transitory computer-readable medium described herein, the first slot and the second slot may have a duration that corresponds to the first SCS associated with the first RAT, the first slot and the second slot overlap with a sub-frame associated with the second RAT, and a duration of the sub-frame corresponds to the second SCS.

In some examples of the method, apparatuses, and non-transitory computer-readable medium described herein, a first orthogonal frequency division multiplexing (OFDM) symbol of the first slot, the second slot, and the sub-frame may be reserved for AGC.

A method for wireless communication at a wireless communication device is described. The method may include: receiving, in a RF spectrum band that supports co-channel coexistence between a first RAT associated with a first SCS and a second RAT associated with a second SCS, during a first slot of two or more consecutive slots of a paired transmission, a first RV of a TB that includes a first set of parity bits and a first set of information bits associated with the TB; and receiving, in the RF spectrum band, during a second slot of the two or more consecutive slots of the paired transmission, a second RV of the TB that includes a second set of parity bits and a second set of information bits associated with the TB.

An apparatus for wireless communication at a wireless communication device is described. The apparatus may include a processor, memory coupled with the processor, and instructions stored in the memory. The instructions may be executable by the processor to cause the apparatus to: receive, in a RF spectrum band that supports co-channel coexistence between a first RAT associated with a first SCS and a second RAT associated with a second SCS, during a first slot of two or more consecutive slots of a paired transmission, a first RV of a TB that includes a first set of parity bits and a first set of information bits associated with the TB; and receive, in the RF spectrum band, during a second slot of the two or more consecutive slots of the paired transmission, a second RV of the TB that includes a second set of parity bits and a second set of information bits associated with the TB.

Another apparatus for wireless communication at a wireless communication device is described. The apparatus may include: means for receiving, in a RF spectrum band that supports co-channel coexistence between a first RAT associated with a first SCS and a second RAT associated with a second SCS, during a first slot of two or more consecutive slots of a paired transmission, a first RV of a TB that includes a first set of parity bits and a first set of information bits associated with the TB; and means for receiving, in the RF spectrum band, during a second slot of the two or more consecutive slots of the paired transmission, a second RV of the TB that includes a second set of parity bits and a second set of information bits associated with the TB.

A non-transitory computer-readable medium storing code for wireless communication at a wireless communication device is described. The code may include instructions executable by a processor to: receive, in a RF spectrum band that supports co-channel coexistence between a first RAT associated with a first SCS and a second RAT associated with a second SCS, during a first slot of two or more consecutive slots of a paired transmission, a first RV of a TB that includes a first set of parity bits and a first set of information bits associated with the TB; and receive, in the RF spectrum band, during a second slot of the two or more consecutive slots of the paired transmission, a second RV of the TB that includes a second set of parity bits and a second set of information bits associated with the TB.

Some examples of the method, apparatuses, and non-transitory computer-readable medium described herein may further include operations, features, means, or instructions for transmitting, via one or more sidelink feedback channel resources, feedback information associated with the first RV or the second RV based on a mapping between the one or more sidelink feedback channel resources and sidelink shared channel resources used for transmission of the first RV or the second RV.

In some examples of the method, apparatuses, and non-transitory computer-readable medium described herein, the one or more sidelink feedback channel resources correspond to sidelink shared channel resources used for transmission of the first RV when feedback reporting may be enabled for the first RV and the one or more sidelink feedback channel resources correspond to sidelink shared channel resources used for transmission of the second RV when feedback reporting may be enabled for the second RV.

In some examples of the method, apparatuses, and non-transitory computer-readable medium described herein, a transmission order of the first RV and the second RV may be based on a RV cycling configuration of the wireless communication device.

Some examples of the method, apparatuses, and non-transitory computer-readable medium described herein may further include operations, features, means, or instructions for disabling paired transmissions in the RF spectrum band based on a CBR associated with the first RAT.

Some examples of the method, apparatuses, and non-transitory computer-readable medium described herein may further include operations, features, means, or instructions for disabling paired transmissions in the RF spectrum band based on a CBR associated with the second RAT.

Some examples of the method, apparatuses, and non-transitory computer-readable medium described herein may further include operations, features, means, or instructions for disabling paired transmissions in the RF spectrum band based on a ratio between traffic associated with the second RAT and traffic associated with the first RAT.

In some examples of the method, apparatuses, and non-transitory computer-readable medium described herein, one of the two or more consecutive slots of the paired transmission includes sidelink feedback channel resources.

In some examples of the method, apparatuses, and non-transitory computer-readable medium described herein, receiving the first RV and the second RV may include operations, features, means, or instructions for receiving the first RV of the TB using a first set of sidelink shared channel resources in the first slot and receiving the second RV using a second set of sidelink shared channel resources in the second slot, where the second slot includes sidelink feedback channel resources.

In some examples of the method, apparatuses, and non-transitory computer-readable medium described herein, receiving the first RV and the second RV may include operations, features, means, or instructions for receiving the first RV of the TB in the first slot using a first MCS and receiving the second RV of the TB in the second slot using a second MCS that may be different from the first MCS, where the second slot includes sidelink feedback channel resources.

Some examples of the method, apparatuses, and non-transitory computer-readable medium described herein may further include operations, features, means, or instructions for receiving, via SCI, an indication that the first RV and the second RV may be a part of the paired transmission.

BRIEF DESCRIPTION OF THE DRAWINGS

FIGS. 11 through 14 illustrate flowcharts showing methods that support techniques for mixed numerology co-channel coexistence in accordance with one or more aspects of the present disclosure.

DETAILED DESCRIPTION

Figure 1:
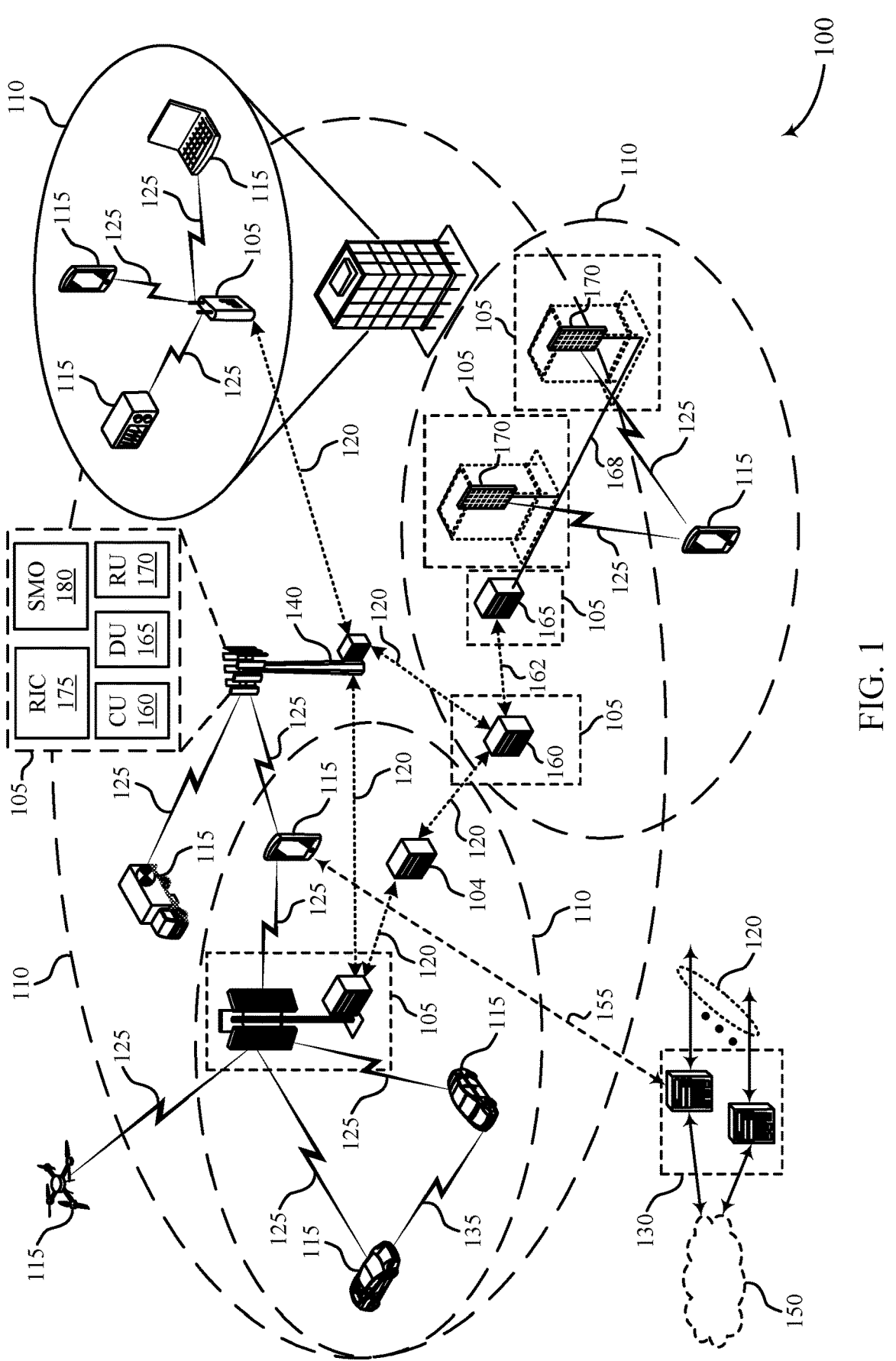
FIGS. 1 and 2 illustrate examples of wireless communications systems that support techniques for mixed numerology co-channel coexistence in accordance with one or more aspects of the present disclosure.

Some wireless communications systems may support a variety of radio access technologies (RATs), such as Long Term Evolution (LTE) Vehicle to Everything (V2X) and New Radio (NR) V2X. In some cases, a radio frequency (RF) spectrum band may be accessible to RATs that have different numerologies. As described herein, a numerology may refer to the subcarrier spacing (SCS) in the frequency domain, orthogonal frequency division multiplexing (OFDM) symbol duration in the time domain, or both, of communications associated with a given RAT. Due to the inverse relationship between SCS and orthogonal frequency division multiplexing (OFDM) symbol duration, the length of a slot (e.g., 14 OFDM symbols) may vary between RATs. For example, a RAT with an SCS of 15 kilohertz (kHz) may have a slot duration that is twice as long as a RAT with an SCS of 30 kHz.

In some communication schemes, the first OFDM symbol of a slot may be reserved for automatic gain control (AGC) operations. During this time period, a receiving device may regulate (e.g., calibrate) the gain of incoming signals to meet a threshold signal to noise ratio (SNR). Once the gain is measured and adjusted, the receiving device may use these gain adjustments for the remainder of the slot. Thus, if another device associated with a different RAT starts or stops transmitting after the first OFDM symbol (e.g., due to variations in numerology and symbol duration), the gain of incoming signals at the receiving device may change, leading to signal clipping, decoding errors, etc.

To reduce the likelihood of communications from a device associated with a first RAT (e.g., a 30 kHz RAT) having an adverse effect on gain control at a device associated with a second RAT (e.g., a 15 kHz RAT), the device associated with the first RAT may be configured to repeat transmissions in two or more consecutive slots (also referred to herein as paired slots). For example, if an NR device transmits a sidelink message in an NR slot that overlaps with an LTE subframe (where NR uses a 30 kHz SCS and LTE uses a 15 kHz SCS), the NR device may repeat the sidelink message in the following NR slot(s) such that gain levels are relatively consistent throughout the LTE subframe. However, this approach may result in lower throughput and poor resource utilization, as the NR device transmits the same information until the end of the LTE subframe.

In accordance with the techniques described herein, a wireless communication device operating in an RF band that supports mixed numerology co-channel coexistence may transmit different redundancy versions (RVs) of a transport block (TB) in a paired transmission that spans two or more consecutive slots. As described herein, an RV may include a combination of parity bits (used for error detection/correction) and information bits from the TB. As an example, an NR device operating in an RF spectrum band that supports coexistence between NR and LTE may transmit a first RV (e.g., a first set of parity pits and information bits) in a first NR slot that overlaps with an LTE subframe, and may transmit a second RV (e.g., a second set of parity bits and information bits) in a second NR slot that overlaps with the LTE subframe.

If, for example, the SCS of the NR device is 60 kHz and the SCS of the LTE device is 15 kHz (such that one LTE subframe spans four NR slots), the NR device may transmit four different RVs in four consecutive NR slots (so gain levels are relatively consistent throughout the LTE subframe). The NR device may transmit each of the RVs using one or more physical sidelink shared channel (PSSCH). If feedback reporting is enabled, the NR device may receive feedback information for the paired transmission via one or more physical sidelink feedback channel (PSFCH) resources that correspond to the one or more PSSCH resources. In some examples, the NR device may use more than one modulation and coding scheme (MCS) to transmit the RVs.

Aspects of the disclosure are initially described in the context of wireless communications systems, resource diagrams, and process flows. Aspects of the disclosure are further illustrated by and described with reference to apparatus diagrams, system diagrams, and flowcharts that relate to techniques for mixed numerology co-channel coexistence.

FIG. 1 illustrates an example of a wireless communications system 100 that supports techniques for mixed numerology co-channel coexistence in accordance with one or more aspects of the present disclosure. The wireless communications system 100 may include one or more network entities 105, one or more UEs 115, and a core network 130. In some examples, the wireless communications system 100 may be an LTE network, an LTE-Advanced (LTE-A) network, an LTE-A Pro network, an NR network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., an RF access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more RATs.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160.

Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor.

An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support techniques for mixed numerology co-channel coexistence as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of an RF spectrum band (e.g., a bandwidth part (BWP)) that is operated according to one or more physical layer channels for a given RAT (e.g., LTE, LTE-A, LTE-A Pro, NR). Each physical layer channel may carry acquisition signaling (e.g., synchronization signals, system information), control signaling that coordinates operation for the carrier, user data, or other signaling.

The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular RAT (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as OFDM (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and SCS may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a SCS ($\Delta$f) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $Ts=1/(\Delta f_{max} \cdot N_f)$ seconds, for which $\Delta f_{max}$ may represent a supported SCS, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on SCS. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the SCS or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115.

For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using V2X communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM)

band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In accordance with aspects of the present disclosure, a wireless communication device (such as a UE 115) may transmit, in a RF spectrum band that supports co-channel coexistence between a first RAT associated with a first SCS and a second RAT associated with a second SCS, during a first slot of two or more consecutive slots of a paired transmission, a first RV of a TB that includes a first set of parity bits and a first set of information bits associated with the TB. Accordingly, the wireless communication device may transmit, in the RF spectrum band, during a second slot of the two or more consecutive slots of the paired transmission, a second RV of the TB that includes a second set of parity bits and a second set of information bits associated with the TB.

Aspects of the wireless communications system 100 may be implemented to realize one or more of the following advantages. The techniques described with reference to FIG. 1 may result in greater spectral efficiency, improved communication reliability, and fewer AGC-related decoding issues, among other benefits. For example, by configuring a wireless communication device (such as a UE 115) to transmit different RVs of a TB in two or more consecutive slots (e.g., paired slots), the techniques described herein may reduce the likelihood of transmissions from the wireless communication device causing gain fluctuations (e.g., spikes, dips) at other devices that are attempting to receive and decode transmissions in the same RF spectrum band, thereby improving the accuracy of AGC operations without decreasing the efficiency of resource utilization in the wireless communications system 100.

Figure 2:
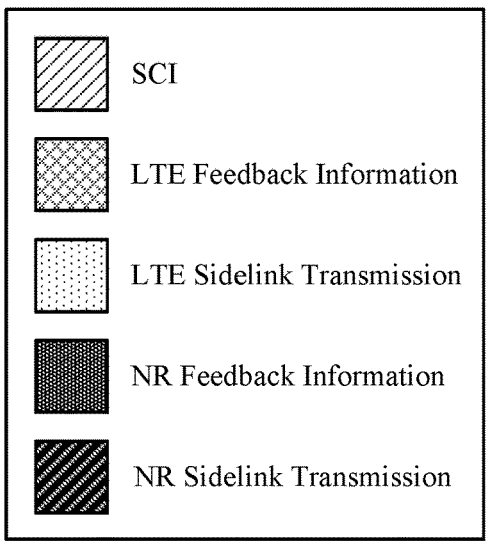
Figure 2:
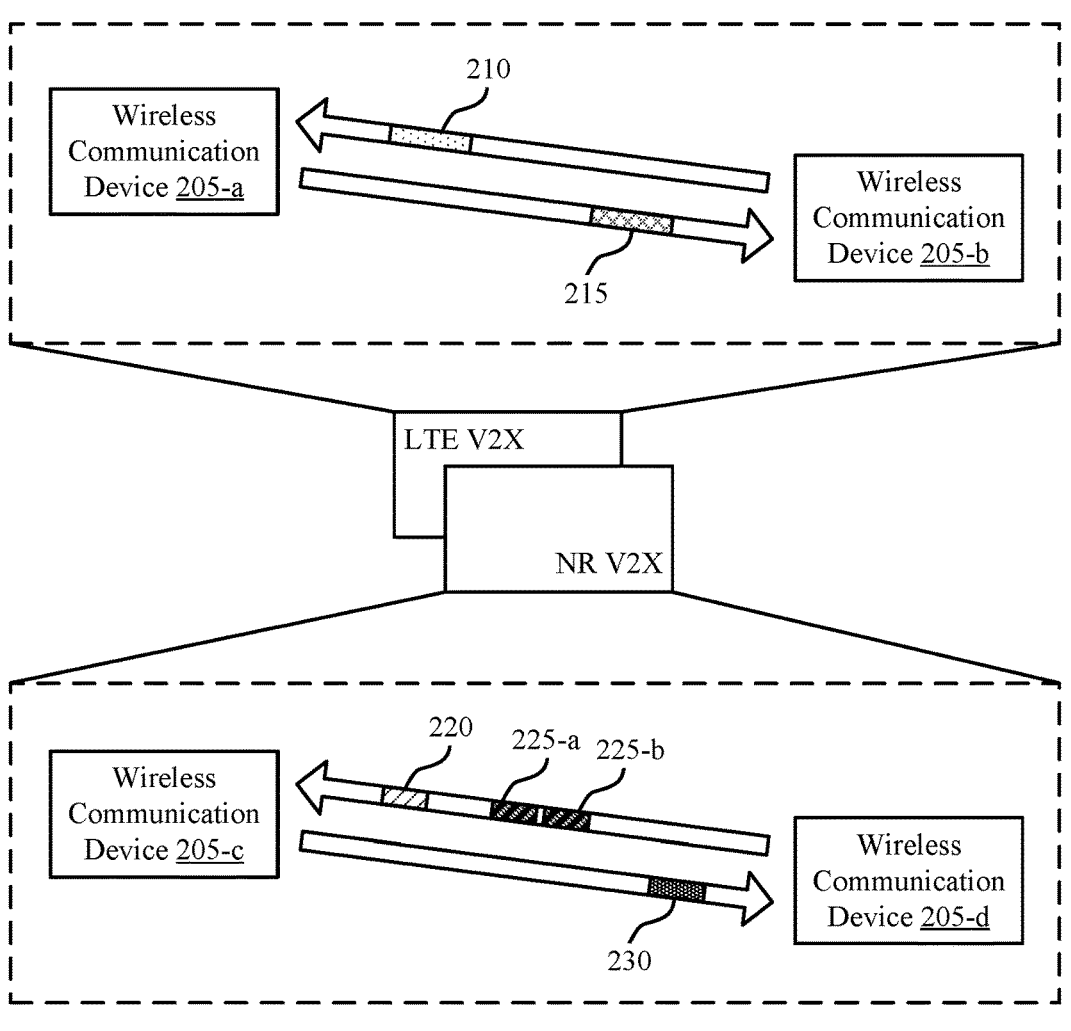

FIG. 2 illustrates an example of a wireless communications system 200 that supports techniques for mixed numerology co-channel coexistence in accordance with one or more aspects of the present disclosure. The wireless communications system 200 may implement or be implemented by aspects of wireless communications system 100. For example, the wireless communications system 200 includes wireless communication devices 205, which may be examples of aspects of a UE 115, as described with reference to FIG. 1. In the wireless communications system 200, a paired transmission from a wireless communication device 205-*d* associated with a first RAT (e.g., NR V2X) may overlap in time and/or frequency with a transmission from a wireless communication device 205-*b* associated with a second RAT (e.g., LTE V2X).

The wireless communications system 200 may support co-channel coexistence between wireless communication devices 205 associated with mixed numerologies. Although some aspects of the present disclosure are described in the context of NR and LTE, it is to be understood that the techniques described herein are applicable to any combination of RATs that utilize different numerologies. In the example of FIG. 2, an RF spectrum band (or a portion thereof) may be available to LTE V2X sidelink devices (such as the wireless communication device 205-*a* and the wireless communication device 205-*b*) as well as NR V2X sidelink devices (such as the wireless communication device 205-*c* and the wireless communication device 205-*d*).

In some examples, an LTE sidelink transmission 210 from the wireless communication device 205-*b* may overlap with an NR sidelink transmission 225-*a* and/or an NR sidelink transmission 225-*b* from the wireless communication device 205-*d*. If, for example, the NR sidelink transmission 225-*a* ends before the LTE sidelink transmission 210 (e.g. due to SCS variations between LTE and NR), the gain of incoming signals at the wireless communication device 205-*a* may decrease, leading to AGC issues, decoding errors, etc. Likewise, if the wireless communication device 205-*d* begins transmitting the NR sidelink transmission 225-*b* while the LTE sidelink transmission 210 is in progress (e.g., after the wireless communication device 205-*a* has completed AGC), the gain of incoming signals at the wireless communication device 205-*a* may increase, leading to AGC issues, signal clipping, etc.

To mitigate AGC issues caused by numerology differences, the wireless communication device 205-*d* may be configured to transmit different RVs of the same TB in two consecutive NR slots (e.g., paired slots) that overlap with an LTE subframe. For example, the wireless communication device 205-*d* may transmit a first RV in one NR slot and a second RV in the following NR slot. As a result, gain levels at the wireless communication device 205-*a* may be relatively consistent while the wireless communication device 205-*a* is attempting to receive and decode the LTE sidelink transmission 210.

In some implementations, the wireless communication device 205-*d* (e.g., the NR transmitter) may use sidelink control information (SCI) 220 to enable or disable paired transmissions. The wireless communication device 205-*d* may disable paired transmissions if, for example, a channel busy ratio (CBR) associated with NR sidelink communications exceeds a threshold, a CBR associated with LTE sidelink communications drops below a threshold, or a ratio between LTE traffic and NR traffic drops below a threshold.

In some implementations, the wireless communication device 205-*a* may transmit feedback information 215 for the LTE sidelink transmission 210 to the wireless communication device 205-*b* using PSFCH resources that correspond to the PSSCH resources used for the LTE sidelink transmission 210. Similarly, the wireless communication device 205-*a* may transmit feedback information 230 for one or both of the NR sidelink transmission 225-*a* or the NR sidelink transmission 225-*b* using PSFCH resources that correspond to the PSSCH resources used for one or both of the NR sidelink transmission 225-*a* or the NR sidelink transmission 225-*b*.

If feedback reporting is enabled for the NR sidelink transmission 225-*a* (e.g., the first RV of the paired transmission), the wireless communication device 205-*c* may use PSFCH resources that correspond to the NR sidelink transmission 225-*a*. Alternatively, if feedback reporting is enabled for the NR sidelink transmission 225-*b* (e.g., the second RV of the paired transmission), the wireless communication device 205-*c* may transmit the feedback information 230 using PSFCH resources that correspond to the NR sidelink transmission 225-*b*.

Figure 3A:
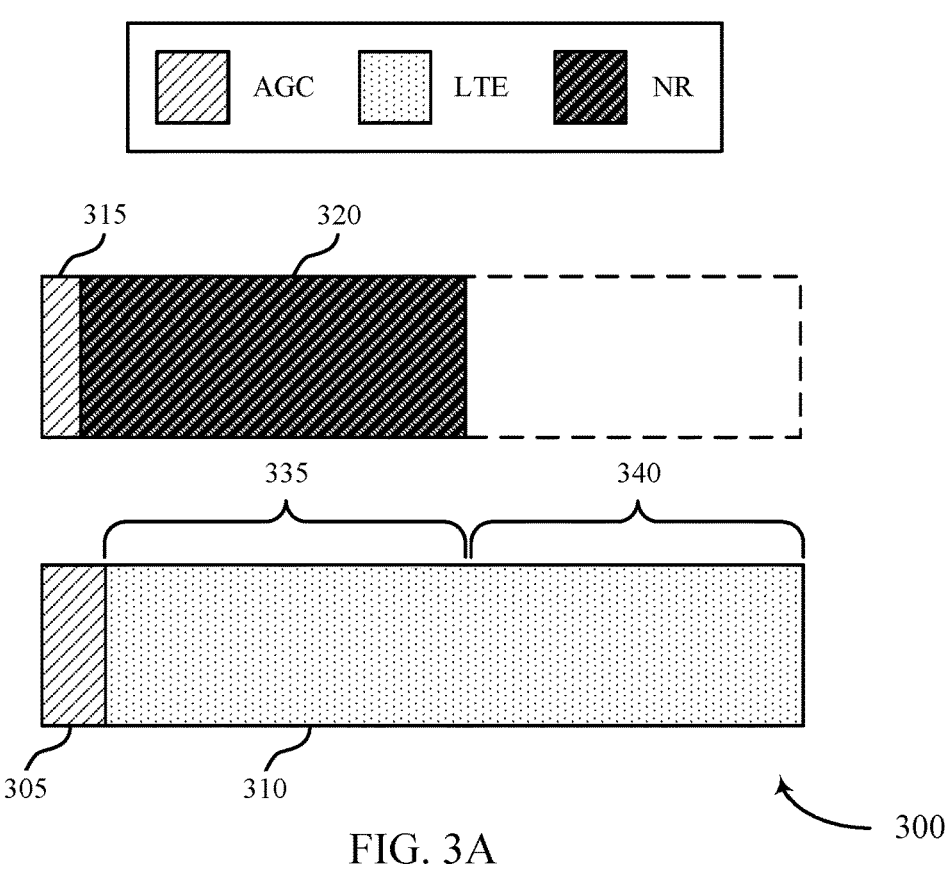
FIGS. 3A and 3B illustrate examples of resource diagrams that support techniques for mixed numerology co-channel coexistence in accordance with one or more aspects of the present disclosure.
Figure 3B:
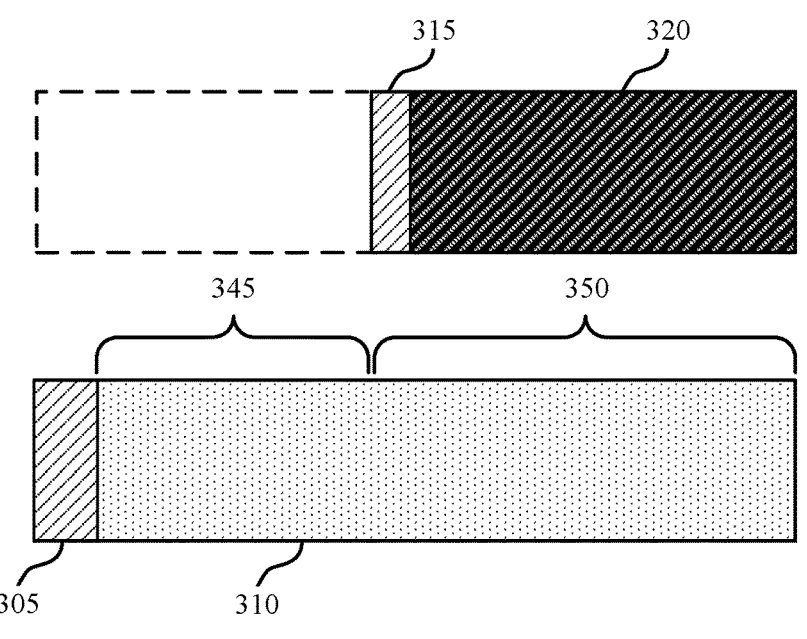
Figure 3B:
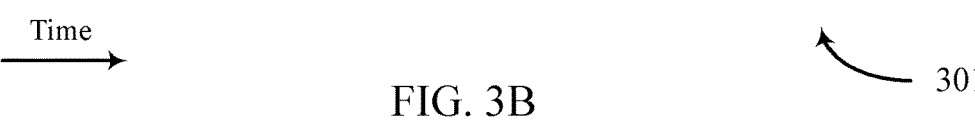

FIGS. 3A and 3B illustrate examples of a resource diagram 300 and a resource diagram 301 that support techniques for mixed numerology co-channel coexistence in accordance with one or more aspects of the present disclosure. The resource diagram 300 and the resource diagram 301 may implement or be implemented by aspects of the wireless communications system 100 or the wireless communications system 200. For example, the resource diagram 300 includes an NR sidelink transmission 320, which may be an example of the NR sidelink transmissions 225 described with reference to FIG. 2. Similarly, the resource diagram 301 includes an LTE sidelink transmission 310, which may be an example of the LTE sidelink transmission 210 described with reference to FIG. 2. The resource diagram 300 illustrates a scenario in which the NR sidelink transmission 320 ends during the LTE sidelink transmission

310, while the resource diagram 301 illustrates a scenario in which the NR sidelink transmission 320 begins during the LTE sidelink transmission 310.

As described herein, some wireless communications systems may support co-channel coexistence between LTE sidelink and NR sidelink. For example, some wireless communications systems may support NR sidelink V2X deployments in RF spectrum bands that are allocated for LTE V2X communications. In some deployments, LTE V2X may use a 15 kHz SCS. In contrast, NR V2X may require support for 30 kHz SCS, with optional support for 15 kHz and 60 kHz SCS in frequency range 1 (FR1), which includes frequencies below 7.125 GHz.

Transmissions from NR sidelink devices may cause interference (for example, in-band emissions) with respect to LTE sidelink reception, and may also affect the received power of incoming signals at other receiving devices (and vice versa). For LTE sidelink communications, the first OFDM symbol 305 of each LTE subframe may be used for AGC training at receiving device(s). NR slots have a similar structure, where the first OFDM symbol 315 of each slot is used for AGC training.

An LTE receiving device may perform AGC training at the beginning of an LTE subframe. Likewise, an NR receiving device may perform AGC training at the beginning of each NR slot. If the received power of incoming signals changes during the LTE subframe (e.g., due to the NR sidelink transmission 320 being shorter than the LTE subframe), gain levels at the LTE receiving device may shift, which could result in degraded LTE performance.

The resource diagram 300 illustrates a scenario in which AGC issues may occur between RATs with mixed numerologies (such as NR sidelink and LTE sidelink). In the example of FIG. 3A, NR sidelink may be using an SCS of 30 kHz, and LTE sidelink may be using an SCS of 15 kHz. As such, the length of LTE subframes may be twice as long as NR slots. An NR sidelink receiver (such as the wireless communication device 205-*c* described with reference to FIG. 2) may perform AGC training during the first OFDM symbol 315 of an NR slot. Accordingly, an NR sidelink transmitter (such as the wireless communication device 205-*d* described with reference to FIG. 2) may transmit an NR sidelink transmission 320 for the remainder of the NR slot.

Similarly, an LTE sidelink receiver (such as the wireless communication device 205-*a*) may perform AGC training during the first OFDM symbol 305 of an LTE subframe. Accordingly, an LTE sidelink receiver (such as the wireless communication device 205-*b*) may transmit an LTE sidelink transmission 310 for the remainder of the LTE subframe. However, because the NR slot is shorter than the LTE subframe, the NR sidelink transmission 320 may end in the middle of the LTE subframe. As a result, the gain settings of the LTE sidelink receiver may be correct for the first portion 335 of the LTE subframe and incorrect for the last portion 340 of the LTE subframe (e.g., when there are no other NR sidelink transmissions taking place).

The resource diagram 301 illustrates another scenario in which AGC issues may occur between RATs with mixed numerologies (such as NR sidelink and LTE sidelink). In the example of FIG. 3B, an LTE sidelink receiver may perform AGC training during the first OFDM symbol 305 of an LTE subframe (e.g., when there are no other NR sidelink transmissions taking place). Accordingly, the LTE sidelink receiver may use the gain settings from the first OFDM symbol 305 to receive an LTE sidelink transmission 310 during the rest of the LTE subframe. If, for example, an NR sidelink transmission 320 begins during the LTE subframe (e.g., after the first OFDM symbol 305) and the gain of incoming signals changes, the gain settings of the LTE sidelink receiver may be correct for the first portion 345 of the LTE subframe and incorrect for the last portion 350 of the LTE subframe.

In accordance with aspects of the present disclosure, the NR sidelink transmitter may be configured to transmit different RVs of the same TB in two consecutive NR slots that overlap with the LTE subframe, thereby enabling the LTE sidelink receiver to decode the LTE sidelink transmission 310 with greater reliability (for example, by reducing the likelihood of the LTE sidelink receiver experiencing AGC issues).

Figure 4:
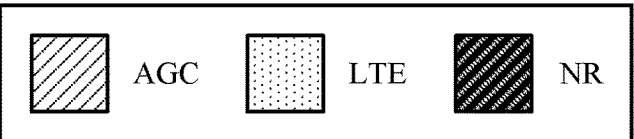
FIGS. 4 and 5 illustrate examples of resource diagrams that support techniques for mixed numerology co-channel coexistence in accordance with one or more aspects of the present disclosure.
Figure 4:
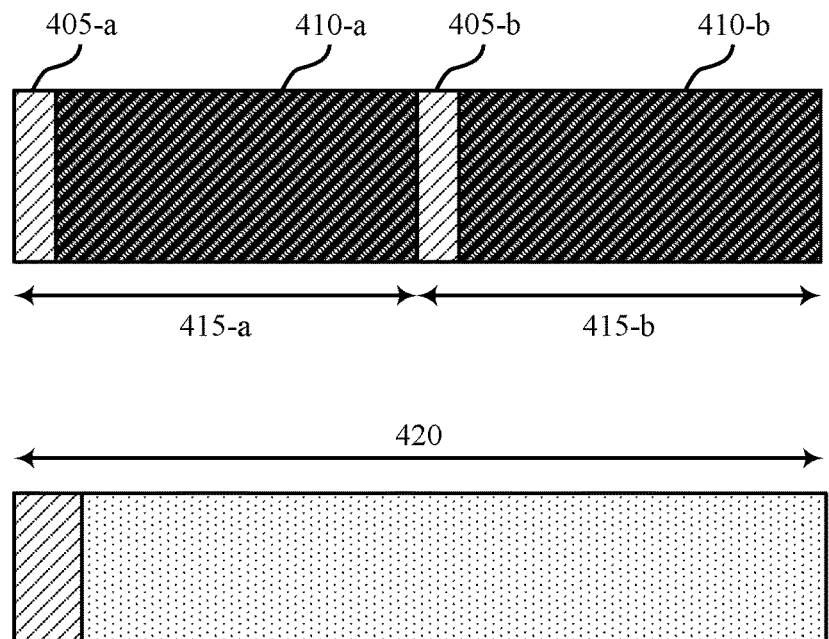

FIG. 4 illustrates an example of a resource diagram 400 that supports techniques for mixed numerology co-channel coexistence in accordance with one or more aspects of the present disclosure. The resource diagram 400 may implement or be implemented by aspects of any of the wireless communications systems or resource diagrams described with reference to FIGS. 1-3B. For example, the resource diagram 400 includes NR sidelink transmissions 410, which may be examples of the NR sidelink transmission 320 described with reference to FIG. 3A. Likewise, the resource diagram 400 includes an LTE sidelink transmission 430, which may be an example of the LTE sidelink transmission 310 described with reference to FIG. 3B. In the resource diagram 400, the NR sidelink transmission 410-a may include a first RV associated with a TB, and the NR sidelink transmission 410-b may include a second (different) RV associated with the same TB.

As described herein, some wireless communications systems may support a variety of RATs, such as LTE V2X and NR V2X. In some cases, an RF spectrum band may be accessible to RATs with different numerologies. Due to the inverse relationship between numerology (e.g., SCS) and OFDM symbol duration, the length of a slot may vary between RATs. For example, a RAT with an SCS of 15 kHz may have a slot duration that is twice as long as a RAT with an SCS of 30 kHz. In some communication schemes, the first OFDM symbol of a slot may be reserved for AGC. During this time period, a receiving device may regulate (e.g., calibrate) the gain of incoming signals to meet a threshold SNR. Once the gain is measured and adjusted, the receiving device may use these gain settings for the remainder of the slot. Thus, if another device associated with a different RAT starts or stops transmitting after the first OFDM symbol (e.g., due to variations in numerology and symbol duration), the gain of incoming signals at the receiving device may change, leading to signal clipping, decoding errors, etc.

There are several approaches to help mitigate mixed numerology AGC issues. One approach is to have a wireless communication device associated with one RAT (e.g., an NR UE) transmit during a number of slots (referred to herein as paired slots) that fully overlap with a subframe or slot associated with another RAT (e.g., LTE), thereby avoiding AGC issues caused by slot misalignment. However, this approach may degrade system utilization efficiency.

The techniques described herein may enable wireless communication devices to utilize paired slots (e.g., to mitigate AGC issues) in a manner that does not significantly degrade system resource utilization efficiency. In accordance with aspects of the present disclosure, a paired transmission may include a retransmission of the same TB. The transmitting device (e.g., an NR UE) may use RV cycling for the paired transmission. The RV order (for example, the order in which different RVs are transmitted) may be pre-configured.

In some examples, feedback may be enabled for the NR sidelink transmission 410-b (e.g., the last transmission of the paired transmission). In other examples, feedback may be enabled for the NR sidelink transmission 410-a (e.g., the first transmission of the paired transmission). PSFCH mapping at the receiving device may be performed according to the transmission(s) with feedback enabled.

Pairing transmissions may be stopped if NR congestion exceeds a threshold (e.g., if CBR is above a threshold), if LTE congestion drops below a threshold, or if a ratio between LTE traffic and NR traffic drops below a threshold. In some implementations, an NR sidelink device may obtain an indication of estimated LTE congestion from a co-located LTE sidelink device. Additionally, or alternatively, the NR sidelink device may determine such information based on sensing results of the NR sidelink device.

In the example of FIG. 4, an LTE sidelink receiver (such as the wireless communication device 205-a described with reference to FIG. 2) may perform AGC training during a first OFDM symbol of the LTE subframe 420. Similarly, an NR sidelink receiver (such as the wireless communication device 205-c described with reference to FIG. 2) may perform AGC training during the first OFDM symbol 405-a of the NR slot 415-a. After the first OFDM symbol 405-a, an NR sidelink transmitter (such as the wireless communication device 205-d described with reference to FIG. 2) may begin an NR sidelink transmission 410-a. Likewise, an LTE sidelink transmitter (such as the wireless communication device 205-b) may begin an LTE sidelink transmission 430 after the first OFDM symbol 425.

If, for example, the NR sidelink devices are using an SCS of 30 kHz and the LTE sidelink devices are using an SCS of 15 kHz, the NR slot 415-a may end before the LTE subframe 420. However, if the NR sidelink transmitter stops transmitting after the NR slot 415-a, gain levels may decrease, and the gain settings determined by the LTE sidelink receiver may be incorrect. To ensure that gain levels stay relatively consistent throughout the LTE subframe 420, the NR sidelink transmitter may re-transmit a different RV of the same TB in the following NR slot 415-b (e.g., after the NR sidelink receiver performs AGC training in the first OFDM symbol 405-b).

Figure 5:
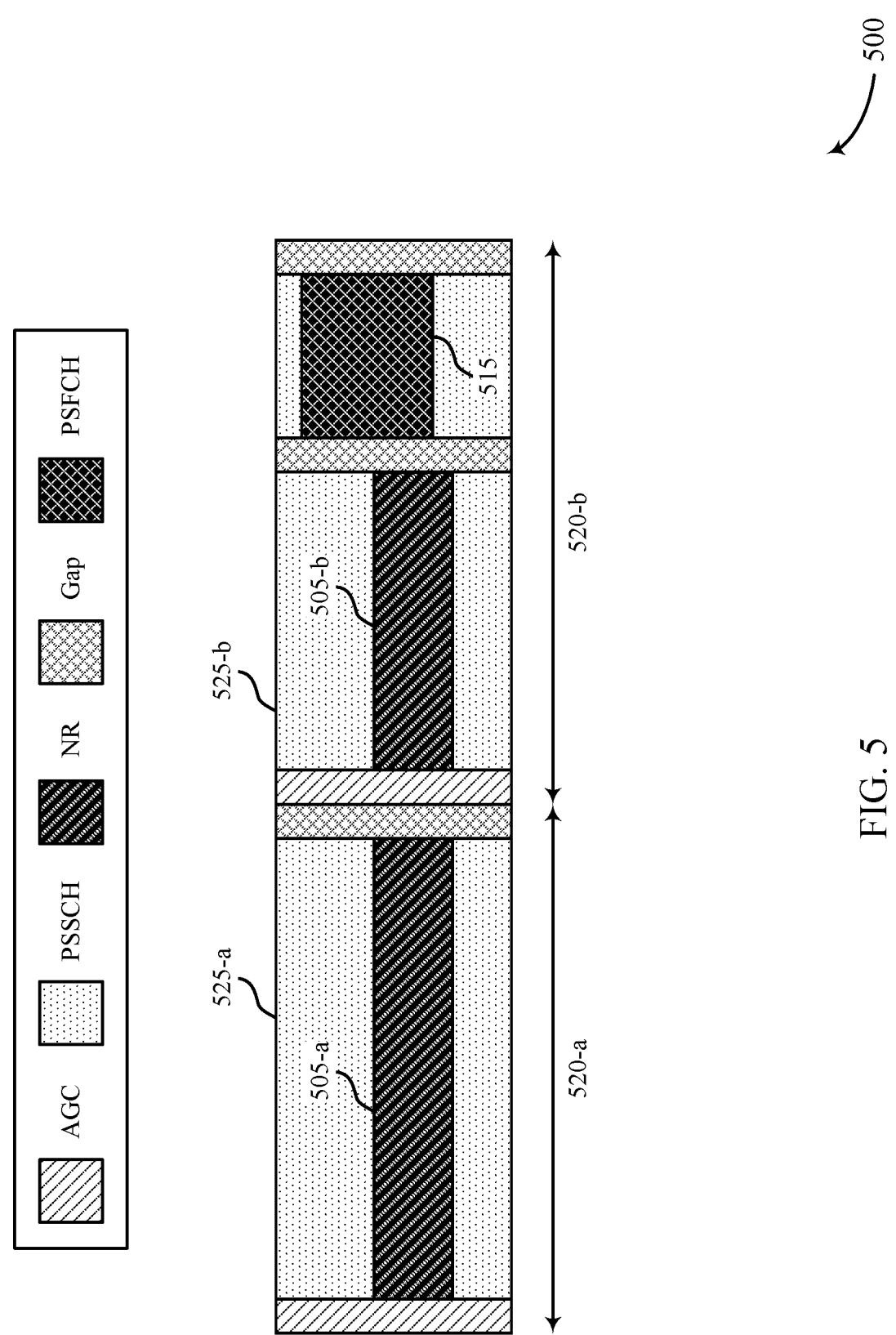

FIG. 5 illustrates an example of a resource diagram 500 that supports techniques for mixed numerology co-channel coexistence in accordance with one or more aspects of the present disclosure. The resource diagram 500 may implement or be implemented by aspects of any of the wireless communications systems or resource diagrams described with reference to FIGS. 1 through 4. For example, the resource diagram 500 includes NR sidelink transmissions 505, which may be examples of the NR sidelink transmissions 410 described with reference to FIG. 4. The resource diagram 500 also includes a slot 520-a (e.g., a first NR slot) and a slot 520-b (e.g., a second NR slot), which may also be referred to as paired slots. As illustrated in the resource diagram 500, the slot 520-b may include a set of PSFCH resources 515.

As described herein with reference to FIGS. 1 through 4, a wireless communication device operating in an RF spectrum band that supports co-channel coexistence between a first RAT (e.g., NR V2X) associated with a first SCS (e.g., 30 kHz or 60 kHz) and a second RAT (e.g., LTE V2X) associated with a second SCS (e.g., 15 kHz) may transmit an NR sidelink transmission 505-a during a slot 520-a (e.g., a first NR slot). The NR sidelink transmission 505-a may include a first RV of a TB, where the first RV includes a first set of parity bits and a first set of information bits from the TB.

Accordingly, the wireless communication device may transmit an NR sidelink transmission 505-*b* during a slot 520-*b* (e.g., a second NR slot). The NR sidelink transmission 505-*b* may include a second RV of the TB, where the second RV includes a second set of parity bits and a second set of information bits from the TB. The NR sidelink transmissions 505 may collectively form a paired transmission that spans two or more consecutive slots. If feedback reporting is enabled for the paired transmission, the wireless communication device may, in some examples, monitor a set of PSFCH resources 515 for feedback information associated with the paired transmission.

As illustrated in the example of FIG. 5, PSFCH resources 515 may be present in one of the paired slots (such as the slot 520-*b*). If the wireless communication device is scheduled or otherwise configured to transmit an NR sidelink transmission 505-*b* using PSSCH resources 525-*b* in the slot 520-*b*, the wireless communication device may also transmit an NR sidelink transmission 505-*a* using PSSCH resources 525-*a* in the slot 520-*a*. Both of the NR sidelink transmissions 505 may include the same TB. In some implementations, the wireless communication device may use a different MCS to encode and transmit the NR sidelink transmission 505-*b* in the slot 520-*b* that includes the PSFCH resources 515. For example, the wireless communication device (e.g., a sidelink UE) may use MCS=a to send TB-1 during the slot 520-*a* and MCS=a +b to re-send TB-1 during the slot 520-*b*.

Aspects of the resource diagram 500 may be implemented to realize one or more of the following advantages. The techniques described with reference to FIG. 5 may result in greater spectral efficiency, improved communication reliability, and fewer AGC-related decoding issues, among other benefits. For example, by configuring an NR device (such as the wireless communication device 205-*d* described with reference to FIG. 2) to transmit different RVs of the same TB in two or more consecutive slots (e.g., paired slots), the techniques described herein may reduce the likelihood of transmissions from the NR device causing gain fluctuations (e.g., spikes, dips) at LTE devices that are attempting to receive and decode transmissions in the same RF spectrum band, thereby improving the accuracy of AGC operations and reducing the impact of paired transmissions on system resource utilization efficiency.

Figure 6:
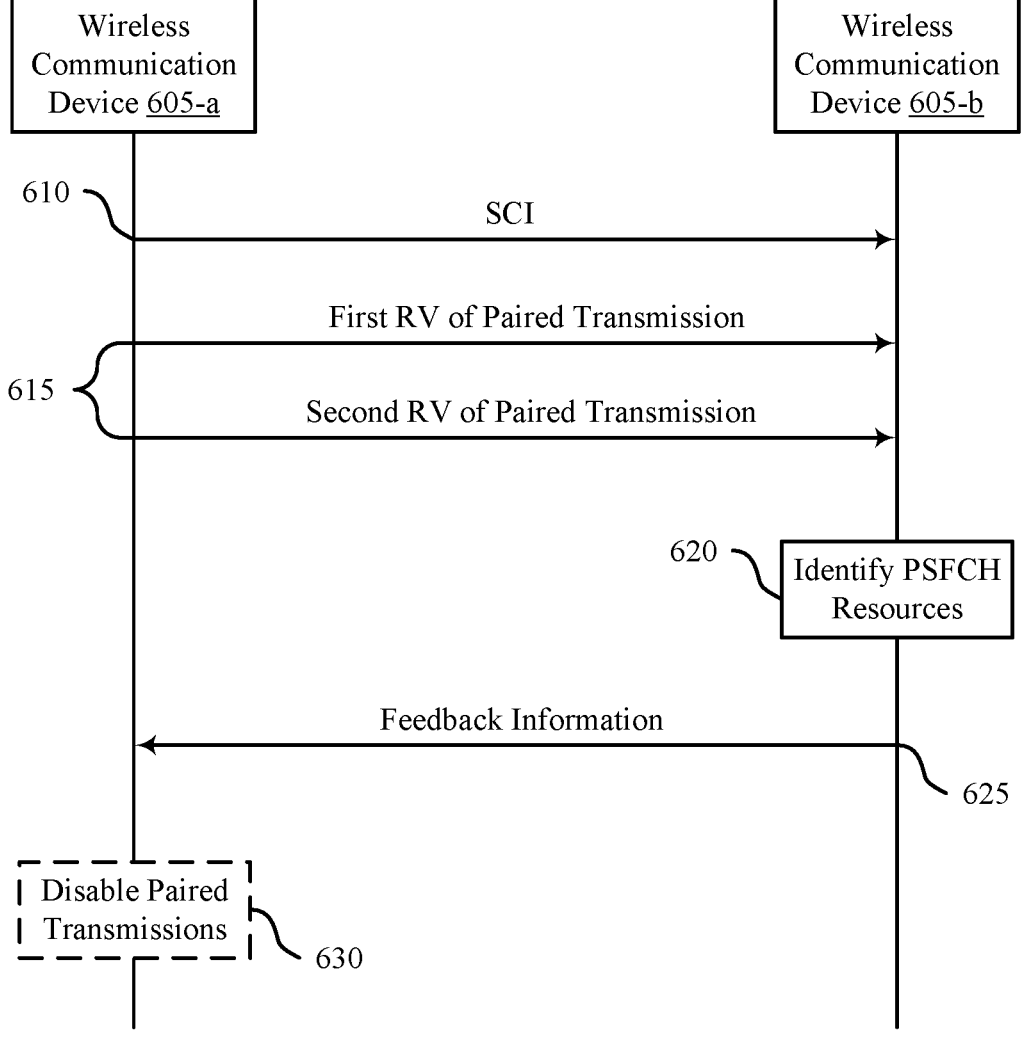
FIG. 6 illustrates an example of a process flow that supports techniques for mixed numerology co-channel coexistence in accordance with one or more aspects of the present disclosure.

FIG. 6 illustrates an example of a process flow 600 that supports techniques for mixed numerology co-channel coexistence in accordance with one or more aspects of the present disclosure. The process flow 600 may implement or be implemented by aspects of any of the wireless communications systems or resource diagrams described with reference to FIGS. 1 through 5. For example, the process flow 600 includes a wireless communication device 605-*a* and a wireless communication device 605-*b*, which may be examples of the wireless communication devices 205 described with reference to FIG. 2. In the following description of the process flow 600, operations between the wireless communication device 605-*a* and the wireless communication device 605-*b* may be added, omitted, or performed in a different order (with respect to the exemplary order shown).

At 610, the wireless communication device 605-*a* may transmit, via SCI (for example, the SCI 220 described with reference to FIG. 2), an indication of an upcoming (or ongoing) paired transmission from the wireless communication device 605-*a*. In some implementations, the SCI may indicate one or more of a slot location, an MCS, an RV cycling pattern, or a feedback configuration associated with the paired transmission.

At 615, the wireless communication device 605-*a* may transmit a paired transmission in an RF spectrum band that supports co-channel coexistence between a first RAT (such as NR V2X) and a second RAT (such as LTE V2X) during two or more consecutive slots (for example, the NR slots 415 described with reference to FIG. 4). The paired transmission may include different RVs of the same TB. For example, during a first slot of the paired transmission (e.g., the NR slot 415-*a* described with reference to FIG. 4), the wireless communication device 605-*b* may transmit a first RV that includes a first set of parity bits and a first set of information bits associated with the TB. During a second slot of the paired transmission (e.g., the NR slot 415-*b* described with reference to FIG. 4), the wireless communication device 605-*a* may transmit a second RV that includes a second set of parity bits and a second set of information bits associated with the TB.

In some examples, the wireless communication device 605-*a* may transmit the first RV and the second RV using a first set of PSSCH resources (such as the PSSCH resources 525-*a* described with reference to FIG. 5) and a second set of PSSCH resources (such as the PSSCH resources 525-*b* described with reference to FIG. 5), respectively. If, for example, the second slot of the paired transmission includes PSFCH resources, the wireless communication device 605-*a* may use a first (e.g., lower) MCS to encode and transmit the first RV and a second (e.g., higher) MCS to encode and transmit the second RV.

At 620, the wireless communication device 605-*b* may identify one or more PSFCH resources (such as the PSFCH resources 515 described with reference to FIG. 5) to use for transmission of feedback information associated with the paired transmission. The wireless communication device 605-*b* may identify the one or more PSFCH resources based on a mapping between PSFCH resources and the PSSCH resources used for the paired transmission. In some implementations, the PSFCH mapping may depend on whether feedback reporting is enabled for the first RV or the second RV.

At 625, the wireless communication device 605-*b* may transmit feedback information (such as the feedback information 230 described with reference to FIG. 2) using the one or more PSFCH resources identified at 620. The feedback information may indicate an acknowledgement (ACK) or negative acknowledgement (NACK) for at least one RV in the paired transmission. More specifically, if feedback reporting is enabled for the first RV, the feedback information may indicate whether the wireless communication device 605-*b* successfully received and decoded the first RV. Likewise, if feedback reporting is enabled for the second RV, the feedback information may indicate whether the wireless communication device 605-*b* successfully received and decoded the second RV.

In some implementations, at 630, the wireless communication device 605-*a* may disable paired transmissions in the RF spectrum band based on a CBR associated with the first RAT, a CBR associated with the second RAT, a ratio between traffic associated with the first RAT and traffic associated with the second RAT, or the like. If, for example, the wireless communication device 605-*a* is co-located with a device associated with the second RAT, the wireless communication device 605-*a* may determine the CBR associated with the second RAT based on measurements obtained or provided by the co-located device.

Aspects of the process flow 600 may be implemented to realize one or more of the following advantages. The techniques described with reference to FIG. 6 may result in greater spectral efficiency, improved communication reliability, and fewer AGC-related decoding issues, among other benefits. For example, by configuring the wireless communication device 605-*a* to transmit different RVs of a TB in two or more consecutive slots (e.g., paired slots), the co-channel coexistence techniques described herein may reduce the likelihood of transmissions from the wireless communication device 605-*a* causing gain fluctuations (e.g., spikes, dips) at other wireless communication devices that are attempting to receive and decode transmissions in the same RF spectrum band, thereby improving the accuracy of AGC operations without degrading system utilization efficiency.

Figure 7:
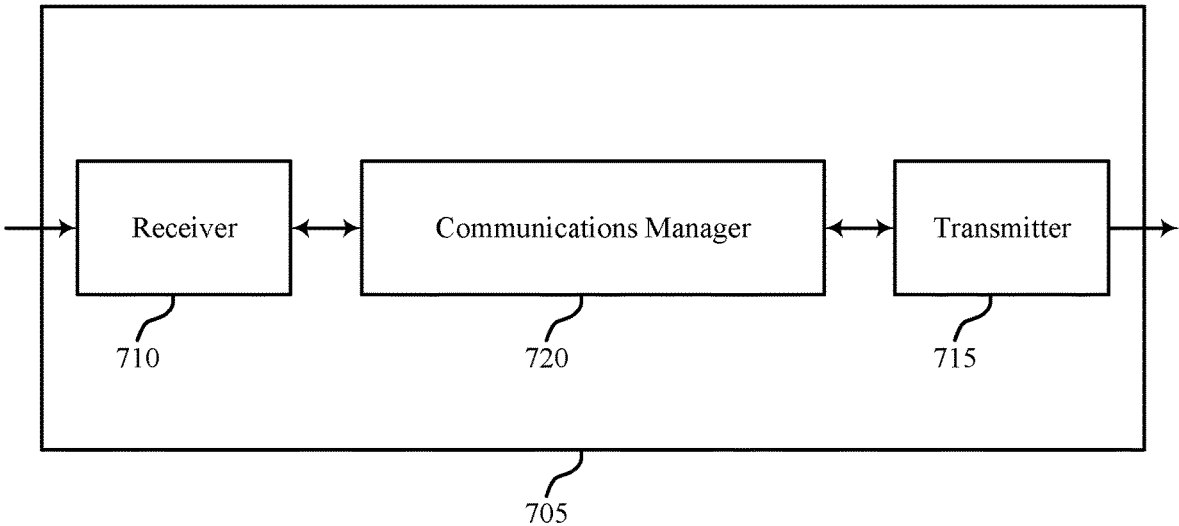
FIGS. 7 and 8 illustrate block diagrams of devices that support techniques for mixed numerology co-channel coexistence in accordance with one or more aspects of the present disclosure.

FIG. 7 illustrates a block diagram 700 of a device 705 that supports techniques for mixed numerology co-channel coexistence in accordance with one or more aspects of the present disclosure. The device 705 may be an example of aspects of a wireless communication device, as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for mixed numerology co-channel coexistence). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for mixed numerology co-channel coexistence). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of techniques for mixed numerology co-channel coexistence as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a wireless communication device in accordance with examples disclosed herein. For example, the communications manager 720 may be configured as or otherwise support a means for transmitting, in an RF spectrum band that supports co-channel coexistence between a first RAT associated with a first SCS and a second RAT associated with a second SCS, during a first slot of two or more consecutive slots of a paired transmission, a first RV of a TB that includes a first set of parity bits and a first set of information bits associated with the TB. The communications manager 720 may be configured as or otherwise support a means for transmitting, in the RF spectrum band, during a second slot of the two or more consecutive slots of the paired transmission, a second RV of the TB that includes a second set of parity bits and a second set of information bits associated with the TB.

Additionally, or alternatively, the communications manager 720 may support wireless communication at a wireless communication device in accordance with examples disclosed herein. For example, the communications manager 720 may be configured as or otherwise support a means for receiving, in an RF spectrum band that supports co-channel coexistence between a first RAT associated with a first SCS and a second RAT associated with a second SCS, during a first slot of two or more consecutive slots of a paired transmission, a first RV of a TB that includes a first set of parity bits and a first set of information bits associated with the TB. The communications manager 720 may be configured as or otherwise support a means for receiving, in the RF spectrum band, during a second slot of the two or more consecutive slots of the paired transmission, a second RV of the TB that includes a second set of parity bits and a second set of information bits associated with the TB.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for more efficient utilization of communication resources.

Figure 8:
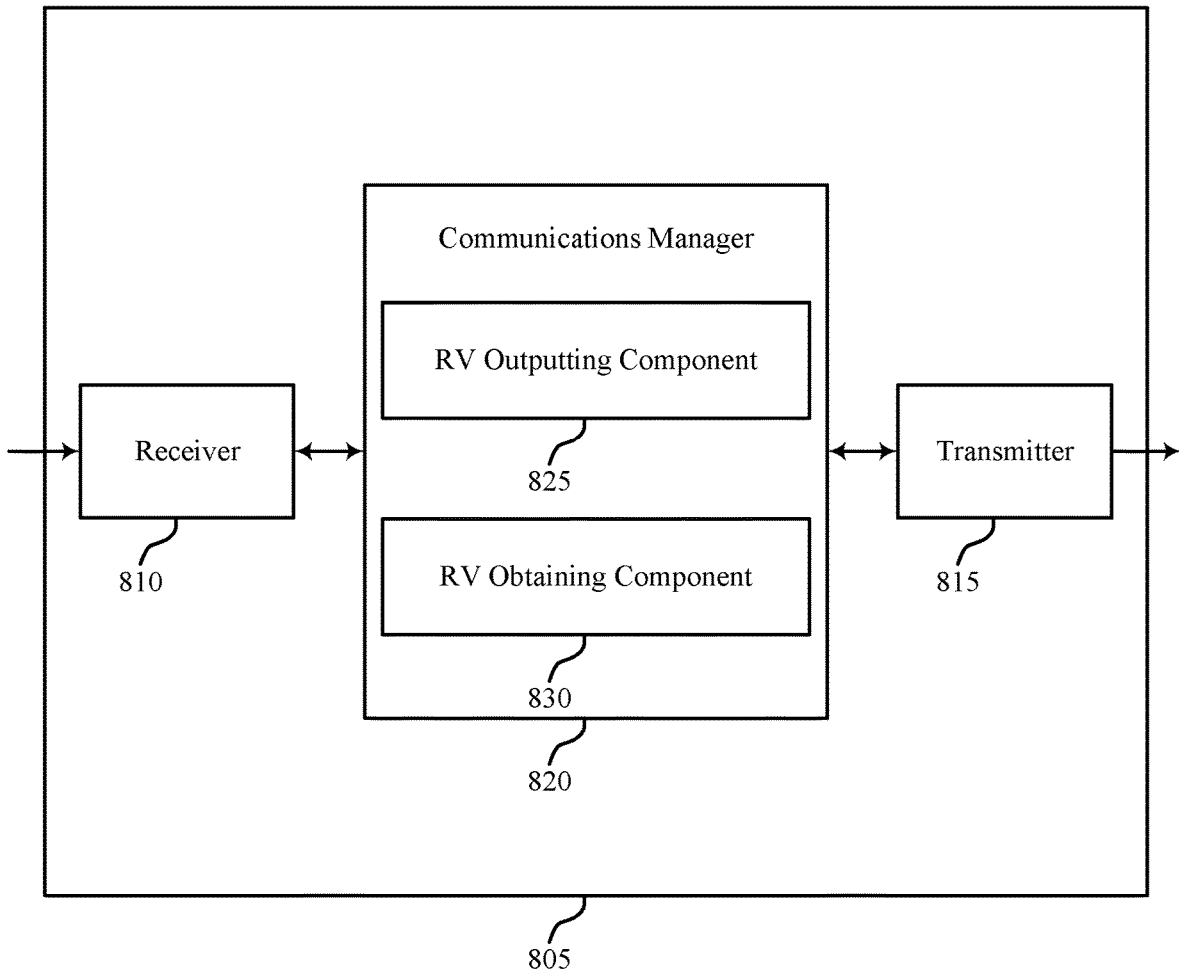

FIG. 8 illustrates a block diagram 800 of a device 805 that supports techniques for mixed numerology co-channel coexistence in accordance with one or more aspects of the present disclosure. The device 805 may be an example of aspects of a device 705 or a UE 115, as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for mixed numerology co-channel coexistence). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for mixed numerology co-channel coexistence). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of techniques for mixed numerology co-channel coexistence as described herein. For example, the communications manager 820 may include an RV outputting component 825 an RV obtaining component 830, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations described herein.

The communications manager 820 may support wireless communication at a wireless communication device in accordance with examples disclosed herein. The RV outputting component 825 may be configured as or otherwise support a means for transmitting, in an RF spectrum band that supports co-channel coexistence between a first RAT associated with a first SCS and a second RAT associated with a second SCS, during a first slot of two or more consecutive slots of a paired transmission, a first RV of a TB that includes a first set of parity bits and a first set of information bits associated with the TB. The RV outputting component 825 may be configured as or otherwise support a means for transmitting, in the RF spectrum band, during a second slot of the two or more consecutive slots of the paired transmission, a second RV of the TB that includes a second set of parity bits and a second set of information bits associated with the TB.

Additionally, or alternatively, the communications manager 820 may support wireless communication at a wireless communication device in accordance with examples disclosed herein. The RV obtaining component 830 may be configured as or otherwise support a means for receiving, in an RF spectrum band that supports co-channel coexistence between a first RAT associated with a first SCS and a second RAT associated with a second SCS, during a first slot of two or more consecutive slots of a paired transmission, a first RV of a TB that includes a first set of parity bits and a first set of information bits associated with the TB. The RV obtaining component 830 may be configured as or otherwise support a means for receiving, in the RF spectrum band, during a second slot of the two or more consecutive slots of the paired transmission, a second RV of the TB that includes a second set of parity bits and a second set of information bits associated with the TB.

Figure 9:
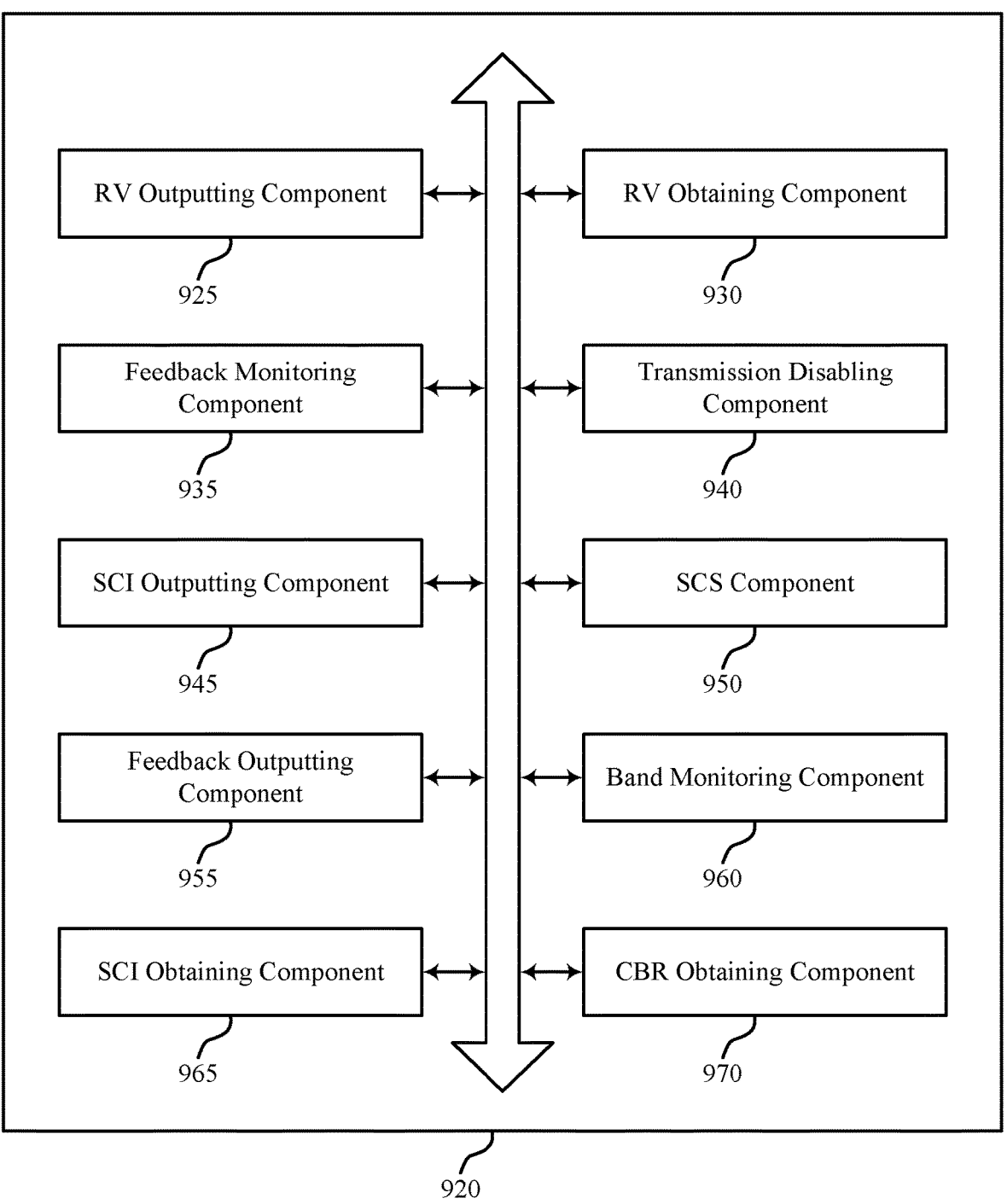
FIG. 9 illustrates a block diagram of an communications manager that supports techniques for mixed numerology co-channel coexistence in accordance with one or more aspects of the present disclosure.

FIG. 9 illustrates a block diagram 900 of an communications manager 920 that supports techniques for mixed numerology co-channel coexistence in accordance with one or more aspects of the present disclosure. The communications manager 920 may be an example of aspects of an communications manager 720, an communications manager 820, or both, as described herein. The communications manager 920, or various components thereof, may be an example of means for performing various aspects of techniques for mixed numerology co-channel coexistence as described herein. For example, the communications manager 920 may include an RV outputting component 925, an RV obtaining component 930, a feedback monitoring component 935, a transmission disabling component 940, an SCI outputting component 945, a SCS component 950, a feedback outputting component 955, a band monitoring component 960, an SCI obtaining component 965, a CBR obtaining component 970, or any combination thereof. Each of these components may communicate, directly or indirectly, with one another (e.g., via one or more buses).

The communications manager 920 may support wireless communication at a wireless communication device in accordance with examples disclosed herein. The RV outputting component 925 may be configured as or otherwise support a means for transmitting, in an RF spectrum band that supports co-channel coexistence between a first RAT associated with a first SCS and a second RAT associated with a second SCS, during a first slot of two or more consecutive slots of a paired transmission, a first RV of a TB that includes a first set of parity bits and a first set of information bits associated with the TB. In some examples, the RV outputting component 925 may be configured as or otherwise support a means for transmitting, in the RF spectrum band, during a second slot of the two or more consecutive slots of the paired transmission, a second RV of the TB that includes a second set of parity bits and a second set of information bits associated with the TB.

In some examples, the feedback monitoring component 935 may be configured as or otherwise support a means for monitoring one or more sidelink feedback channel resources for feedback information associated with the first RV or the second RV based on a mapping between the one or more sidelink feedback channel resources and sidelink shared channel resources used for transmission of the first RV or the second RV.

In some examples, the one or more sidelink feedback channel resources correspond to sidelink shared channel resources used for transmission of the first RV when feedback reporting is enabled for the first RV. In some examples, the one or more sidelink feedback channel resources correspond to sidelink shared channel resources used for transmission of the second RV when feedback reporting is enabled for the second RV. In some examples, a transmission order of the first RV and the second RV is based on a RV cycling configuration of the wireless communication device.

In some examples, the transmission disabling component 940 may be configured as or otherwise support a means for disabling paired transmissions in the RF spectrum band based on a CBR associated with the first RAT.

In some examples, the transmission disabling component 940 may be configured as or otherwise support a means for disabling paired transmissions in the RF spectrum band based at least in part a CBR associated with the second RAT.

In some examples, the CBR obtaining component 970 may be configured as or otherwise support a means for obtaining an indication of the CBR associated with the second RAT from a collocated device associated with the second RAT or from one or more channel measurements performed by the wireless communication device.

In some examples, the transmission disabling component 940 may be configured as or otherwise support a means for disabling paired transmissions in the RF spectrum band based on a ratio between traffic associated with the second RAT and traffic associated with the first RAT. In some examples, one of the two or more consecutive slots of the paired transmission includes sidelink feedback channel resources.

In some examples, to support transmitting the first RV and the second RV, the RV outputting component 925 may be configured as or otherwise support a means for transmitting the first RV of the TB using a first set of sidelink shared channel resources in the first slot. In some examples, to support transmitting the first RV and the second RV, the RV outputting component 925 may be configured as or otherwise support a means for transmitting the second RV using a second set of sidelink shared channel resources in the second slot, where the second slot includes sidelink feedback channel resources.

In some examples, to support transmitting the first RV and the second RV, the RV outputting component 925 may be configured as or otherwise support a means for transmitting the first RV of the TB in the first slot using a first MCS (MCS). In some examples, to support transmitting the first RV and the second RV, the RV outputting component 925 may be configured as or otherwise support a means for transmitting the second RV of the TB in the second slot using a second MCS that is different from the first MCS, where the second slot includes sidelink feedback channel resources.

In some examples, the SCI outputting component 945 may be configured as or otherwise support a means for transmitting, via SCI, an indication that the first RV and the second RV are a part of the paired transmission from the wireless communication device.

In some examples, the first RV and the second RV are a part of the paired transmission that includes one or more retransmissions of the TB. In some examples, the second RAT includes an LTE V2X sidelink RAT and the first RAT includes an NR V2X sidelink RAT. In some examples, the first SCS is 30 kHz and the second SCS is 15 kHz.

In some examples, the first slot and the second slot have a duration that corresponds to the first SCS associated with the first RAT. In some examples, the first slot and the second slot overlap with a subframe associated with the second RAT. In some examples, a duration of the subframe corresponds to the second SCS. In some examples, a first OFDM symbol of the first slot, the second slot, and the subframe are reserved for AGC.

Additionally, or alternatively, the communications manager 920 may support wireless communication at a wireless communication device in accordance with examples disclosed herein. The RV obtaining component 930 may be configured as or otherwise support a means for receiving, in an RF spectrum band that supports co-channel coexistence between a first RAT associated with a first SCS and a second RAT associated with a second SCS, during a first slot of two or more consecutive slots of a paired transmission, a first RV of a TB that includes a first set of parity bits and a first set of information bits associated with the TB. In some examples, the RV obtaining component 930 may be configured as or otherwise support a means for receiving, in the RF spectrum band, during a second slot of the two or more consecutive slots of the paired transmission, a second RV of the TB that includes a second set of parity bits and a second set of information bits associated with the TB.

In some examples, the feedback outputting component 955 may be configured as or otherwise support a means for transmitting, via one or more sidelink feedback channel resources, feedback information associated with the first RV or the second RV based on a mapping between the one or more sidelink feedback channel resources and sidelink shared channel resources used for transmission of the first RV or the second RV.

In some examples, the one or more sidelink feedback channel resources correspond to sidelink shared channel resources used for transmission of the first RV when feedback reporting is enabled for the first RV. In some examples, the one or more sidelink feedback channel resources correspond to sidelink shared channel resources used for transmission of the second RV when feedback reporting is enabled for the second RV.

In some examples, a transmission order of the first RV and the second RV is based on a RV cycling configuration of the wireless communication device. In some examples, the band monitoring component 960 may be configured as or otherwise support a means for disabling paired transmissions in the RF spectrum band based on a CBR associated with the first RAT.

In some examples, the band monitoring component 960 may be configured as or otherwise support a means for disabling paired transmissions in the RF spectrum band based on a CBR associated with the second RAT.

In some examples, the band monitoring component 960 may be configured as or otherwise support a means for disabling paired transmissions in the RF spectrum band based on a ratio between traffic associated with the second RAT and traffic associated with the first RAT. In some examples, one of the two or more consecutive slots of the paired transmission includes sidelink feedback channel resources.

In some examples, to support receiving the first RV and the second RV, the RV obtaining component 930 may be configured as or otherwise support a means for receiving the first RV of the TB using a first set of sidelink shared channel resources in the first slot. In some examples, to support receiving the first RV and the second RV, the RV obtaining component 930 may be configured as or otherwise support a means for receiving the second RV using a second set of sidelink shared channel resources in the second slot, where the second slot includes sidelink feedback channel resources.

In some examples, to support receiving the first RV and the second RV, the RV obtaining component 930 may be configured as or otherwise support a means for receiving the first RV of the TB in the first slot using a first MCS (MCS).

In some examples, to support receiving the first RV and the second RV, the RV obtaining component 930 may be configured as or otherwise support a means for receiving the second RV of the TB in the second slot using a second MCS that is different from the first MCS, where the second slot includes sidelink feedback channel resources.

In some examples, the SCI obtaining component 965 may be configured as or otherwise support a means for receiving, via SCI, an indication that the first RV and the second RV are a part of the paired transmission.

Figure 10:
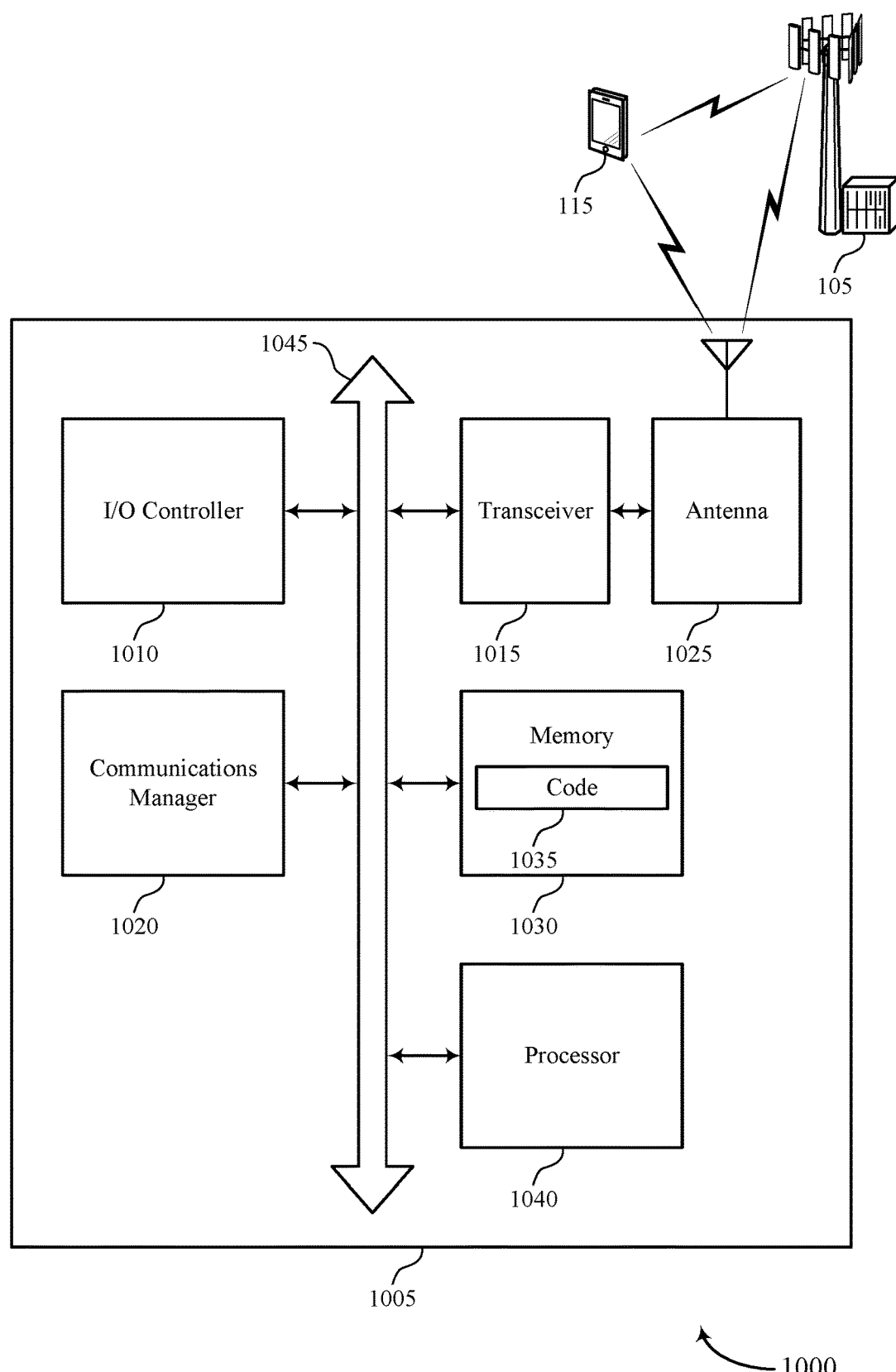
FIG. 10 illustrates a diagram of a system including a device that supports techniques for mixed numerology co-channel coexistence in accordance with one or more aspects of the present disclosure.

FIG. 10 illustrates a diagram of a system 1000 including a device 1005 that supports techniques for mixed numerology co-channel coexistence in accordance with one or more aspects of the present disclosure. The device 1005 may be an example of or include the components of a device 705, a device 805, or a wireless communication device (e.g., a UE 115), as described herein. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random-access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS), which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting techniques for mixed numerology co-channel coexistence). For example, the device 1005 or a component of the device 1005 may include a processor 1040 and memory 1030 coupled with or to the processor 1040, the processor 1040 and memory 1030 configured to perform various functions described herein.

The communications manager 1020 may support wireless communication at a wireless communication device in accordance with examples disclosed herein. For example, the communications manager 1020 may be configured as or otherwise support a means for transmitting, in an RF spectrum band that supports co-channel coexistence between a first RAT associated with a first SCS and a second RAT associated with a second SCS, during a first slot of two or more consecutive slots of a paired transmission, a first RV of a TB that includes a first set of parity bits and a first set of information bits associated with the TB. The communications manager 1020 may be configured as or otherwise support a means for transmitting, in the RF spectrum band, during a second slot of the two or more consecutive slots of the paired transmission, a second RV of the TB that includes a second set of parity bits and a second set of information bits associated with the TB.

Additionally, or alternatively, the communications manager 1020 may support wireless communication at a wireless communication device in accordance with examples disclosed herein. For example, the communications manager 1020 may be configured as or otherwise support a means for receiving, in an RF spectrum band that supports co-channel coexistence between a first RAT associated with a first SCS and a second RAT associated with a second SCS, during a first slot of two or more consecutive slots of a paired transmission, a first RV of a TB that includes a first set of parity bits and a first set of information bits associated with the TB. The communications manager 1020 may be configured as or otherwise support a means for receiving, in the RF spectrum band, during a second slot of the two or more consecutive slots of the paired transmission, a second RV of the TB that includes a second set of parity bits and a second set of information bits associated with the TB.

By including or configuring the communications manager 1020 in accordance with examples as described herein, the device 1005 may support techniques for improved communication reliability, greater spectral efficiency, and fewer AGC-related decoding errors, among other benefits.

FIG. 11 illustrates a flowchart showing a method 1100 that supports techniques for mixed numerology co-channel coexistence in accordance with one or more aspects of the present disclosure. The operations of the method 1100 may be implemented by a wireless communication device or components thereof. For example, the operations of the method 1100 may be performed by a wireless communication device, such as the wireless communication device 205-*d* described with reference to FIG. 2. In some examples, the wireless communication device may execute a set of instructions to control the functional elements of the wireless communication device to perform the described functions. Additionally, or alternatively, the wireless communication device may perform aspects of the described functions using special-purpose hardware.

At 1105, the wireless communication device may transmit, in an RF spectrum band that supports co-channel coexistence between a first RAT associated with a first SCS and a second RAT associated with a second SCS, during a first slot of two or more consecutive slots of a paired transmission, a first RV of a TB that includes a first set of parity bits and a first set of information bits associated with the TB. The operations of 1105 may be performed in accordance with examples disclosed herein. In some examples, aspects of the operations of 1105 may be performed by an RV outputting component 925, as described with reference to FIG. 9.

At 1110, the wireless communication device may transmit, in the RF spectrum band, during a second slot of the two or more consecutive slots of the paired transmission, a second RV of the TB that includes a second set of parity bits and a second set of information bits associated with the TB. The operations of 1110 may be performed in accordance with examples disclosed herein. In some examples, aspects of the operations of 1110 may be performed by an RV outputting component 925, as described with reference to FIG. 9.

FIG. 12 illustrates a flowchart showing a method 1200 that supports techniques for mixed numerology co-channel coexistence in accordance with one or more aspects of the present disclosure. The operations of the method 1200 may be implemented by a wireless communication device or components thereof. For example, the operations of the method 1200 may be performed by a wireless communication device, such as the wireless communication device 605-*a* described with reference to FIG. 6. In some examples, the wireless communication device may execute a set of instructions to control the functional elements of the wireless communication device to perform the described functions. Additionally, or alternatively, the wireless communication device may perform aspects of the described functions using special-purpose hardware.

At 1205, the wireless communication device may transmit, in an RF spectrum band that supports co-channel coexistence between a first RAT associated with a first SCS and a second RAT associated with a second SCS, during a first slot of two or more consecutive slots of a paired transmission, a first RV of a TB that includes a first set of parity bits and a first set of information bits associated with the TB. The operations of 1205 may be performed in accordance with examples disclosed herein. In some examples, aspects of the operations of 1205 may be performed by an RV outputting component 925, as described with reference to FIG. 9.

At 1210, the wireless communication device may transmit, in the RF spectrum band, during a second slot of the two or more consecutive slots of the paired transmission, a second RV of the TB that includes a second set of parity bits and a second set of information bits associated with the TB.

The operations of 1210 may be performed in accordance with examples disclosed herein. In some examples, aspects of the operations of 1210 may be performed by an RV outputting component 925, as described with reference to FIG. 9.

At 1215, the wireless communication device may monitor one or more sidelink feedback channel resources for feedback information associated with the first RV or the second RV based on a mapping between the one or more sidelink feedback channel resources and sidelink shared channel resources used for transmission of the first RV or the second RV. The operations of 1215 may be performed in accordance with examples disclosed herein. In some examples, aspects of the operations of 1215 may be performed by a feedback monitoring component 935, as described with reference to FIG. 9.

FIG. 13 illustrates a flowchart showing a method 1300 that supports techniques for mixed numerology co-channel coexistence in accordance with one or more aspects of the present disclosure. The operations of the method 1300 may be implemented by a wireless communication device or components thereof. For example, the operations of the method 1300 may be performed by a wireless communication device, such as the wireless communication device 205-*c* described with reference to FIG. 2. In some examples, the wireless communication device may execute a set of instructions to control the functional elements of the wireless communication device to perform the described functions. Additionally, or alternatively, the wireless communication device may perform aspects of the described functions using special-purpose hardware.

At 1305, the wireless communication device may receive, in an RF spectrum band that supports co-channel coexistence between a first RAT associated with a first SCS and a second RAT associated with a second SCS, during a first slot of two or more consecutive slots of a paired transmission, a first RV of a TB that includes a first set of parity bits and a first set of information bits associated with the TB. The operations of 1305 may be performed in accordance with examples disclosed herein. In some examples, aspects of the operations of 1305 may be performed by an RV obtaining component 930, as described with reference to FIG. 9.

At 1310, the wireless communication device may receive, in the RF spectrum band, during a second slot of the two or more consecutive slots of the paired transmission, a second RV of the TB that includes a second set of parity bits and a second set of information bits associated with the TB. The operations of 1310 may be performed in accordance with examples disclosed herein. In some examples, aspects of the operations of 1310 may be performed by an RV obtaining component 930, as described with reference to FIG. 9.

FIG. 14 illustrates a flowchart showing a method 1400 that supports techniques for mixed numerology co-channel coexistence in accordance with one or more aspects of the present disclosure. The operations of the method 1400 may be implemented by a wireless communication device or components thereof. For example, the operations of the method 1400 may be performed by a wireless communication device, such as the wireless communication device 605-*b* described with reference to FIG. 6. In some examples, the wireless communication device may execute a set of instructions to control the functional elements of the wireless communication device to perform the described functions. Additionally, or alternatively, the wireless communication device may perform aspects of the described functions using special-purpose hardware.

At 1405, the wireless communication device may receive, via SCI, an indication that the first RV and the second RV are a part of the paired transmission. The operations of 1405 may be performed in accordance with examples disclosed herein. In some examples, aspects of the operations of 1405 may be performed by an SCI obtaining component 965, as described with reference to FIG. 9.

At 1410, the wireless communication device may receive, in an RF spectrum band that supports co-channel coexistence between a first RAT associated with a first SCS and a second RAT associated with a second SCS, during a first slot of two or more consecutive slots of a paired transmission, a first RV of a TB that includes a first set of parity bits and a first set of information bits associated with the TB. The operations of 1410 may be performed in accordance with examples disclosed herein. In some examples, aspects of the operations of 1410 may be performed by an RV obtaining component 930, as described with reference to FIG. 9.

At 1415, the wireless communication device may receive, in the RF spectrum band, during a second slot of the two or more consecutive slots of the paired transmission, a second RV of the TB that includes a second set of parity bits and a second set of information bits associated with the TB. The operations of 1415 may be performed in accordance with examples disclosed herein. In some examples, aspects of the operations of 1415 may be performed by an RV obtaining component 930, as described with reference to FIG. 9.

The following provides an overview of aspects of the present disclosure:

Aspect 1: A method for wireless communication at a wireless communication device, comprising: transmitting, in a RF spectrum band that supports co-channel coexistence between a first RAT associated with a first SCS and a second RAT associated with a second SCS, during a first slot of two or more consecutive slots of a paired transmission, a first RV of a TB that comprises a first set of parity bits and a first set of information bits associated with the TB; and transmitting, in the RF spectrum band, during a second slot of the two or more consecutive slots of the paired transmission, a second RV of the TB that comprises a second set of parity bits and a second set of information bits associated with the TB.

Aspect 2: The method of aspect 1, further comprising: monitoring one or more sidelink feedback channel resources for feedback information associated with the first RV or the second RV based at least in part on a mapping between the one or more sidelink feedback channel resources and sidelink shared channel resources used for transmission of the first RV or the second RV.

Aspect 3: The method of aspect 2, wherein the one or more sidelink feedback channel resources correspond to sidelink shared channel resources used for transmission of the first RV when feedback reporting is enabled for the first RV; and the one or more sidelink feedback channel resources correspond to sidelink shared channel resources used for transmission of the second RV when feedback reporting is enabled for the second RV.

Aspect 4: The method of any of aspects 1 through 3, wherein a transmission order of the first RV and the second RV is based at least in part on a RV cycling configuration of the wireless communication device.

Aspect 5: The method of any of aspects 1 through 4, further comprising: disabling paired transmissions in the RF spectrum band based at least in part on a CBR associated with the first RAT.

Aspect 6: The method of any of aspects 1 through 5, further comprising: disabling paired transmissions in the RF spectrum band based at least in part a CBR associated with the second RAT.

Aspect 7: The method of aspect 6, further comprising: obtaining an indication of the CBR associated with the second RAT from a collocated device associated with the second RAT or from one or more channel measurements performed by the wireless communication device.

Aspect 8: The method of any of aspects 1 through 7, further comprising: disabling paired transmissions in the RF spectrum band based at least in part on a ratio between traffic associated with the second RAT and traffic associated with the first RAT.

Aspect 9: The method of any of aspects 1 through 8, wherein one of the two or more consecutive slots of the paired transmission includes sidelink feedback channel resources.

Aspect 10: The method of any of aspects 1 through 9, wherein transmitting the first RV and the second RV comprises: transmitting the first RV of the TB using a first set of sidelink shared channel resources in the first slot; and transmitting the second RV using a second set of sidelink shared channel resources in the second slot, wherein the second slot includes sidelink feedback channel resources.

Aspect 11: The method of any of aspects 1 through 10, wherein transmitting the first RV and the second RV comprises: transmitting the first RV of the TB in the first slot using a first MCS; and transmitting the second RV of the TB in the second slot using a second MCS that is different from the first MCS, wherein the second slot includes sidelink feedback channel resources.

Aspect 12: The method of any of aspects 1 through 11, further comprising: transmitting, via SCI, an indication that the first RV and the second RV are a part of the paired transmission from the wireless communication device.

Aspect 13: The method of any of aspects 1 through 12, wherein the first RV and the second RV are a part of the paired transmission that includes one or more retransmissions of the TB.

Aspect 14: The method of any of aspects 1 through 13, wherein the second RAT comprises an LTE V2X sidelink RAT and the first RAT comprises a NR V2X sidelink RAT.

Aspect 15: The method of any of aspects 1 through 14, wherein the first SCS is 30 kHz and the second SCS is 15 kHz.

Aspect 16: The method of any of aspects 1 through 15, wherein the first slot and the second slot have a duration that corresponds to the first SCS associated with the first RAT; the first slot and the second slot overlap with a sub-frame associated with the second RAT; and a duration of the sub-frame corresponds to the second SCS.

Aspect 17: The method of aspect 16, wherein a first OFDM symbol of the first slot, the second slot, and the sub-frame are reserved for AGC.

Aspect 18: A method for wireless communication at a wireless communication device, comprising: receiving, in a RF spectrum band that supports co-channel coexistence between a first RAT associated with a first SCS and a second RAT associated with a second SCS, during a first slot of two or more consecutive slots of a paired transmission, a first RV of a TB that comprises a first set of parity bits and a first set of information bits associated with the TB; and receiving, in the RF spectrum band, during a second slot of the two or more consecutive slots of the paired transmission, a second RV of the TB that comprises a second set of parity bits and a second set of information bits associated with the TB.

Aspect 19: The method of aspect 18, further comprising: transmitting, via one or more sidelink feedback channel resources, feedback information associated with the first RV or the second RV based at least in part on a mapping between the one or more sidelink feedback channel resources and sidelink shared channel resources used for transmission of the first RV or the second RV.

Aspect 20: The method of aspect 19, wherein the one or more sidelink feedback channel resources correspond to sidelink shared channel resources used for transmission of the first RV when feedback reporting is enabled for the first RV; and the one or more sidelink feedback channel resources correspond to sidelink shared channel resources used for transmission of the second RV when feedback reporting is enabled for the second RV.

Aspect 21: The method of any of aspects 18 through 20, wherein a transmission order of the first RV and the second RV is based at least in part on a RV cycling configuration of the wireless communication device.

Aspect 22: The method of any of aspects 18 through 21, further comprising: disabling paired transmissions in the RF spectrum band based at least in part on a CBR (CBR) associated with the first RAT.

Aspect 23: The method of any of aspects 18 through 22, further comprising: disabling paired transmissions in the RF spectrum band based at least in part on a CBR associated with the second RAT.

Aspect 24: The method of any of aspects 18 through 23, further comprising: disabling paired transmissions in the RF spectrum band based at least in part on a ratio between traffic associated with the second RAT and traffic associated with the first RAT.

Aspect 25: The method of any of aspects 18 through 24, wherein one of the two or more consecutive slots of the paired transmission includes sidelink feedback channel resources.

Aspect 26: The method of any of aspects 18 through 25, wherein receiving the first RV and the second RV comprises: receiving the first RV of the TB using a first set of sidelink shared channel resources in the first slot; and receiving the second RV using a second set of sidelink shared channel resources in the second slot, wherein the second slot includes sidelink feedback channel resources.

Aspect 27: The method of any of aspects 18 through 26, wherein receiving the first RV and the second RV comprises: receiving the first RV of the TB in the first slot using a first MCS; and receiving the second RV of the TB in the second slot using a second MCS that is different from the first MCS, wherein the second slot includes sidelink feedback channel resources.

Aspect 28: The method of any of aspects 18 through 27, further comprising: receiving, via SCI, an indication that the first RV and the second RV are a part of the paired transmission.

Aspect 29: An apparatus for wireless communication at a wireless communication device, comprising: a processor; memory coupled with the processor; and instructions stored in the memory and executable by the processor to cause the apparatus to perform a method of any of aspects 1 through 17.

Aspect 30: An apparatus for wireless communication at a wireless communication device, comprising at least one means for performing a method of any of aspects 1 through 17.

Aspect 31: A non-transitory computer-readable medium storing code for wireless communication at a wireless communication device, the code comprising instructions executable by a processor to perform a method of any of aspects 1 through 17.

Aspect 32: An apparatus for wireless communication at a wireless communication device, comprising: a processor; memory coupled with the processor; and instructions stored in the memory and executable by the processor to cause the apparatus to perform a method of any of aspects 18 through 28.

Aspect 33: An apparatus for wireless communication at a wireless communication device, comprising at least one means for performing a method of any of aspects 18 through 28.

Aspect 34: A non-transitory computer-readable medium storing code for wireless communication at a wireless communication device, the code comprising instructions executable by a processor to perform a method of any of aspects 18 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (e.g., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A wireless communication device, comprising:
one or more memories storing processor-executable code; and
one or more processors coupled with the one or more memories and operable to execute the code to cause the wireless communication device to:
transmit, in a radio frequency spectrum band that supports co-channel coexistence between a first radio access technology associated with a first subcarrier spacing and a second radio access technology associated with a second subcarrier spacing, during a first slot of two or more consecutive slots of a paired transmission that is configured to overlap with a subframe of the second radio access technology, a first redundancy version of a transport block that comprises a first set of parity bits and a first set of information bits associated with the transport block, wherein the first redundancy version is transmitted as part of the paired transmission and via the first radio access technology; and
transmit, in the radio frequency spectrum band, during a second slot of the two or more consecutive slots of the paired transmission that is configured to overlap with the subframe of the second radio access technology, a second redundancy version of the transport block that comprises a second set of parity bits and a second set of information bits associated with the transport block, wherein the second redundancy version is transmitted as part of the paired transmission and via the first radio access technology.

2. The wireless communication device of claim 1, wherein the one or more processors are further operable to execute the code to cause the wireless communication device to:
monitor one or more sidelink feedback channel resources for feedback information associated with the first redundancy version or the second redundancy version based at least in part on a mapping between the one or more sidelink feedback channel resources and sidelink shared channel resources used for transmission of the first redundancy version or the second redundancy version.

3. The apparatus of claim 2, wherein:

the one or more sidelink feedback channel resources correspond to sidelink shared channel resources used for transmission of the first redundancy version when feedback reporting is enabled for the first redundancy version; and the one or more sidelink feedback channel resources correspond to sidelink shared channel resources used for transmission of the second redundancy version when feedback reporting is enabled for the second redundancy version.

4. The apparatus of claim 1, wherein a transmission order of the first redundancy version and the second redundancy version is based at least in part on a redundancy version cycling configuration of the wireless communication device.

5. The wireless communication device of claim 1, wherein the one or more processors are further operable to execute the code to cause the wireless communication device to:

disable paired transmissions in the radio frequency spectrum band based at least in part on a channel busy ratio (CBR) associated with the first radio access technology.

6. The wireless communication device of claim 1, wherein the one or more processors are further operable to execute the code to cause the wireless communication device to:

disable paired transmissions in the radio frequency spectrum band based at least in part on a channel busy ratio (CBR) associated with the second radio access technology.

7. The wireless communication device of claim 6, wherein the one or more processors are further operable to execute the code to cause the apparatus to:

obtain an indication of the CBR associated with the second radio access technology from a collocated device associated with the second radio access technology or from one or more channel measurements performed by the wireless communication device.

8. The wireless communication device of claim 1, wherein the one or more processors are further operable to execute the code to cause the wireless communication device to:

disable paired transmissions in the radio frequency spectrum band based at least in part on a ratio between traffic associated with the second radio access technology and traffic associated with the first radio access technology.

9. The wireless communication device of claim 1, wherein:

one of the two or more consecutive slots of the paired transmission includes sidelink feedback channel resources.

10. The wireless communication device of claim 1, wherein, to transmit the first redundancy version and the second redundancy version, the one or more processors are operable to execute the code to cause the wireless communication device to:

transmit the first redundancy version of the transport block using a first set of sidelink shared channel resources in the first slot; and transmit the second redundancy version using a second set of sidelink shared channel resources in the second slot, wherein the second slot includes sidelink feedback channel resources.

11. The wireless communication device of claim 1, wherein, to transmit the first redundancy version and the second redundancy version, the one or more processors are operable to execute the code to cause the wireless communication device to:

transmit the first redundancy version of the transport block in the first slot using a first modulation and coding scheme (MCS); and transmit the second redundancy version of the transport block in the second slot using a second MCS that is different from the first MCS, wherein the second slot includes sidelink feedback channel resources.

12. The wireless communication device of claim 1, wherein the one or more processors are further operable to execute the code to cause the wireless communication device to:

transmit, via sidelink control information (SCI), an indication that the first redundancy version and the second redundancy version are a part of the paired transmission from the wireless communication device.

13. The wireless communication device of claim 1, wherein the first redundancy version and the second redundancy version are a part of the paired transmission that includes one or more retransmissions of the transport block.

14. The wireless communication device of claim 1, wherein the second radio access technology comprises a Long Term Evolution (LTE) Vehicle to Everything (V2X) sidelink radio access technology and the first radio access technology comprises a New Radio (NR) V2X sidelink radio access technology.

15. The wireless communication device of claim 1, wherein the first subcarrier spacing is 30 kilohertz (kHz) and the second subcarrier spacing is 15 kHz.

16. The wireless communication device of claim 1, wherein:

the first slot and the second slot have a first duration that corresponds to the first subcarrier spacing associated with the first radio access technology; and a second duration of the subframe corresponds to the second subcarrier spacing.

17. The wireless communication device of claim 16, wherein:

a first orthogonal frequency division multiplexing (OFDM) symbol of the first slot, the second slot, and the sub-frame are reserved for automatic gain control (AGC).

18. A wireless communication device, comprising:

one or more memories storing processor-executable code; and one or more processors coupled with the one or more memories and operable to execute the code to cause the wireless communication device to:

receive, in a radio frequency spectrum band that supports co-channel coexistence between a first radio access technology associated with a first subcarrier spacing and a second radio access technology associated with a second subcarrier spacing, during a first slot of two or more consecutive slots of a paired transmission that is configured to overlap with a subframe of the second radio access technology, a first redundancy version of a transport block that comprises a first set of parity bits and a first set of information bits associated with the transport block, wherein the first redundancy version is received as part of the paired transmission and via the first radio access technology; and receive, in the radio frequency spectrum band, during a second slot of the two or more consecutive slots of the paired transmission that is configured to overlap with the subframe of the second radio access technology, a second redundancy version of the transport block that comprises a second set of parity bits and a second set of information bits associated with the transport block, wherein the second redundancy version is received as part of the paired transmission and via the first radio access technology.

19. The wireless communication device of claim 18, wherein the one or more processors are further operable to execute the code to cause the wireless communication device to:

transmit, via one or more sidelink feedback channel resources, feedback information associated with the first redundancy version or the second redundancy version based at least in part on a mapping between the one or more sidelink feedback channel resources and sidelink shared channel resources used for transmission of the first redundancy version or the second redundancy version.

20. The wireless communication device of claim 19, wherein:

the one or more sidelink feedback channel resources correspond to sidelink shared channel resources used for transmission of the first redundancy version when feedback reporting is enabled for the first redundancy version; and the one or more sidelink feedback channel resources correspond to sidelink shared channel resources used for transmission of the second redundancy version when feedback reporting is enabled for the second redundancy version.

21. The wireless communication device of claim 18, wherein a transmission order of the first redundancy version and the second redundancy version is based at least in part on a redundancy version cycling configuration of the wireless communication device.

22. The wireless communication device of claim 18, wherein the one or more processors are further operable to execute the code to cause the wireless communication device to:

disable paired transmissions in the radio frequency spectrum band based at least in part on a channel busy ratio (CBR) associated with the first radio access technology.

23. The wireless communication device of claim 18, wherein the one or more processors are further operable to execute the code to cause the wireless communication device to:

disable paired transmissions in the radio frequency spectrum band based at least in part on a channel busy ratio (CBR) associated with the second radio access technology.

24. The wireless communication device of claim 18, wherein the one or more processors are further operable to execute the code to cause the wireless communication device to:

disable paired transmissions in the radio frequency spectrum band based at least in part on a ratio between traffic associated with the second radio access technology and traffic associated with the first radio access technology.

25. The wireless communication device of claim 18, wherein:

one of the two or more consecutive slots of the paired transmission includes sidelink feedback channel resources.

26. The wireless communication device of claim 18, wherein, to receive the first redundancy version and the second redundancy version, the one or more processors are operable to execute the code to cause the wireless communication device to:

receive the first redundancy version of the transport block using a first set of sidelink shared channel resources in the first slot; and receive the second redundancy version using a second set of sidelink shared channel resources in the second slot, wherein the second slot includes sidelink feedback channel resources.

27. The wireless communication device of claim 18, wherein, to receive the first redundancy version and the second redundancy version, the one or more processors are operable to execute the code to cause the wireless communication device to:

receive the first redundancy version of the transport block in the first slot using a first modulation and coding scheme (MCS); and receive the second redundancy version of the transport block in the second slot using a second MCS that is different from the first MCS, wherein the second slot includes sidelink feedback channel resources.

28. The wireless communication device of claim 18, wherein the one or more processors are further operable to execute the code to cause the wireless communication device to:

receive, via sidelink control information (SCI), an indication that the first redundancy version and the second redundancy version are a part of the paired transmission.

29. A method for wireless communication at a wireless communication device, comprising:

transmitting, in a radio frequency spectrum band that supports co-channel coexistence between a first radio access technology associated with a first subcarrier spacing and a second radio access technology associated with a second subcarrier spacing, during a first slot of two or more consecutive slots of a paired transmission that is configured to overlap with a subframe of the second radio access technology, a first redundancy version of a transport block that comprises a first set of parity bits and a first set of information bits associated with the transport block, wherein the first redundancy version is transmitted as part of the paired transmission and via the first radio access technology; and transmitting, in the radio frequency spectrum band, during a second slot of the two or more consecutive slots of the paired transmission that is configured to overlap with the subframe of the second radio access technology, a second redundancy version of the transport block that comprises a second set of parity bits and a second set of information bits associated with the transport block, wherein the second redundancy version is transmitted as part of the paired transmission and via the first radio access technology.

30. A method for wireless communication at a wireless communication device, comprising:

receiving, in a radio frequency spectrum band that supports co-channel coexistence between a first radio access technology associated with a first subcarrier spacing and a second radio access technology associated with a second subcarrier spacing, during a first slot of two or more consecutive slots of a paired transmission that is configured to overlap with a subframe of the second radio access technology, a first redundancy version of a transport block that comprises a first set of parity bits and a first set of information bits associated with the transport block, wherein the first redundancy version is received as part of the paired transmission and via the first radio access technology; and receiving, in the radio frequency spectrum band, during a second slot of the two or more consecutive slots of the paired transmission that is configured to overlap with the subframe of the second radio access technology, a second redundancy version of the transport block that comprises a second set of parity bits and a second set of information bits associated with the transport block, wherein the second redundancy version is received as part of the paired transmission and via the first radio access technology.

\* \* \* \* \*